United States Patent
Wu et al.

(10) Patent No.: US 11,452,049 B2
(45) Date of Patent: Sep. 20, 2022

(54) POWER SHARING METHOD AND APPARATUS

(71) Applicant: HUAWEI TECHNOLOGIES CO., LTD., Guangdong (CN)

(72) Inventors: Kang Wu, Shanghai (CN); Yan Zhang, Shanghai (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 0 days.

(21) Appl. No.: 17/158,550

(22) Filed: Jan. 26, 2021

(65) Prior Publication Data
US 2021/0153141 A1    May 20, 2021

Related U.S. Application Data

(63) Continuation of application No. PCT/CN2018/097663, filed on Jul. 27, 2018.

(51) Int. Cl.
*H04W 52/34* (2009.01)

(52) U.S. Cl.
CPC ................. *H04W 52/343* (2013.01)

(58) Field of Classification Search
CPC . H04W 52/34; H04W 52/343; H04W 52/346; H04W 52/367; H04W 52/143
USPC ...................... 455/522, 69, 452.1, 509, 67.11
See application file for complete search history.

(56) References Cited

U.S. PATENT DOCUMENTS

| | | | | |
|---|---|---|---|---|
| 2010/0111023 A1* | 5/2010 | Pelletier | ............... | H04L 5/0053 370/329 |
| 2013/0225227 A1* | 8/2013 | Ericson | ............... | H04W 52/143 455/522 |
| 2016/0255594 A1* | 9/2016 | Vajapeyam | ......... | H04W 52/346 455/522 |
| 2021/0227409 A1* | 7/2021 | Siomina | ................ | H04W 24/08 |

FOREIGN PATENT DOCUMENTS

| | | |
|---|---|---|
| CN | 1964208 A | 5/2007 |
| CN | 101056129 A | 10/2007 |
| CN | 101310452 A | 11/2008 |
| CN | 101742522 A | 6/2010 |
| CN | 101808396 A | 8/2010 |
| CN | 101969646 A | 2/2011 |

(Continued)

*Primary Examiner* — John J Lee
(74) *Attorney, Agent, or Firm* — Womble Bond Dickinson (US) LLP

(57) ABSTRACT

This application provides a power sharing method and apparatus. The method includes: estimating a first transmit power based on a traffic volume of terminal devices to be scheduled in a first carrier in a first scheduling period, where the first transmit power is a transmit power required in the first carrier to schedule the to-be-scheduled terminal devices in the first scheduling period; and estimating a second transmit power based on the first transmit power and an initially configured transmit power of the first carrier, where the second transmit power is a remaining transmit power of the first carrier in the first scheduling period. According to the power sharing method and apparatus provided in this application, a remaining transmit power of a carrier in a scheduling period is estimated based on the traffic volume of the to-be-scheduled terminal devices, thereby improving accuracy of transmit power sharing.

20 Claims, 10 Drawing Sheets

(56) References Cited

FOREIGN PATENT DOCUMENTS

| | | |
|---|---|---|
| CN | 102056307 A | 5/2011 |
| CN | 106413073 A | 2/2017 |
| CN | 107005849 A | 8/2017 |
| EP | 2280507 A1 | 2/2011 |
| EP | 2541998 A1 | 1/2013 |
| WO | 2008040229 A1 | 4/2008 |
| WO | 2012060750 A1 | 5/2012 |
| WO | 2016172877 A1 | 11/2016 |

* cited by examiner

POWER SHARING METHOD AND APPARATUS

CROSS-REFERENCE TO RELATED APPLICATIONS

This application is a continuation of International Application No. PCT/CN2018/097663, filed on Jul. 27, 2018, the disclosure of which is hereby incorporated by reference in its entirety.

TECHNICAL FIELD

This application relates to the communications field, and more specifically, to a power sharing method and apparatus.

BACKGROUND

With development of the mobile communications technology and popularization of multi-frequency remote radio units (RRU), an increasing quantity of network devices implement configuration of a plurality of carriers for a same transmit power amplifier.

In the prior art, for carriers sharing the same transmit power amplifier, the network device calculates a remaining transmit power of each carrier in a next scheduling period based on a percentage of a remaining transmit power in a historical scheduling period of the carrier, and the remaining transmit power of the carrier is used as a basis for determining transmit power sharing between carriers in the next scheduling period. The power sharing method has low accuracy. Therefore, how to improve accuracy of transmit power calculation and further improve accuracy of the transmit power sharing becomes an urgent problem to be resolved.

SUMMARY

This application provides a power sharing method and apparatus, to improve accuracy of transmit power sharing.

According to a first aspect, a power sharing method is provided, including: estimating a first transmit power based on a traffic volume of terminal devices to be scheduled in a first carrier in a first scheduling period, where the first transmit power is a transmit power required in the first carrier to schedule the to-be-scheduled terminal devices in the first scheduling period; and estimating a second transmit power based on the first transmit power and an initially configured transmit power, where the second transmit power is a remaining transmit power of the first carrier in the first scheduling period.

According to the power sharing method in this embodiment of this application, a remaining second transmit power of the first carrier in the first scheduling period is calculated based on the traffic volume of the to-be-scheduled terminal devices, so that accuracy of transmit power calculation can be improved, and transmit power sharing can be performed based on the second transmit power obtained through calculation, thereby improving accuracy of the transmit power sharing.

It should be understood that the second transmit power may be a positive number, a negative number, or 0.

When the second transmit power is a positive number, it indicates that the first carrier has a remaining transmit power.

When the second transmit power is a negative number, it indicates that the first carrier requires an extra transmit power.

When the second transmit power is 0, it indicates that the first carrier has no remaining transmit power and needs no extra transmit power.

With reference to the first aspect, in some implementations of the first aspect, the method further includes: exchanging a sharable transmit power of the first carrier and a sharable transmit power of another carrier in a transmit power sharing group in a broadcast manner to perform transmit power sharing, where the first carrier is any carrier in the transmit power sharing group.

According to the power sharing method in this embodiment of this application, the first carrier and the another carrier in the transmit power sharing group exchange, in the broadcast manner, the sharable transmit power of the first carrier and the sharable transmit power of the another carrier, and each carrier directly broadcasts, in the transmit power sharing group, the sharable transmit power of the carrier, so that all carriers in the transmit power sharing group can directly exchange information about the sharable transmit power. There is no need to configure a scheduler for each carrier in the transmit power sharing group, thereby improving reliability of the transmit power sharing in the transmit power sharing group.

It should be understood that the another carrier in the transmit power sharing group refers to at least one carrier, other than the first carrier, in the transmit power sharing group. The sharable transmit power refers to a transmit power that the carrier may provide for the another carrier in the transmit power sharing group, or a transmit power that the carrier needs to provide for the another carrier in the transmit power sharing group. That the sharable transmit power of the first carrier and the sharable transmit power of the another carrier are exchanged in the broadcast manner means that: the sharable transmit power of each carrier does not need to be sent to a carrier, but a message is sent to a carrier in the transmit power sharing group.

With reference to the first aspect and the foregoing implementations of the first aspect, in another implementation of the first aspect, the method further includes: calculating a third transmit power based on the second transmit power and a preset shared transmit power, where the third transmit power is the sharable transmit power of the first carrier in the first scheduling period; broadcasting information about the third transmit power to the transmit power sharing group, where the transmit power sharing group includes a plurality of carriers; receiving information about a fourth transmit power, where the fourth transmit power is the sharable transmit power of the another carrier, other than the first carrier, in the transmit power sharing group; and calculating a fifth transmit power based on the information about the third transmit power and the information about the fourth transmit power, where the fifth transmit power is an actually shared transmit power of the first carrier in the first scheduling period.

According to the power sharing method in this embodiment of this application, the sharable third transmit power of the first carrier is determined based on the remaining second transmit power obtained through calculation and the preset shared transmit power, the information about the third transmit power is broadcast to the transmit power sharing group, and the another carrier in the transmit power sharing group also broadcast, in the same manner, the information about the sharable fourth transmit power of the another carrier. The first carrier can determine the actually shared fifth transmit power based on the information about the third transmit power and the information about the fourth transmit power.

It should be understood that the first carrier is merely an example, and the first carrier is any carrier in the transmit power sharing group. In other words, it may be understood that any carrier in the transmit power sharing group may determine, based on a sharable transmit power obtained by the carrier through calculation and received information that is broadcast by another carrier in the transmit power sharing group and that is about the sharable transmit power, an actually shared transmit power of the carrier.

It should be further understood that, a carrier in the transmit power sharing group sends, to another carrier in the transmit power sharing group in the broadcast manner, the sharable transmit power of the carrier, which can improve reliability of the message about the sharable transmit power, and reduce a delay in sending the message about the sharable transmit power.

With reference to the first aspect and the foregoing implementations of the first aspect, in another implementation of the first aspect, the method further includes: calculating a sixth transmit power based on the fifth transmit power and the initially configured transmit power, where the sixth transmit power is a maximum transmit power in the first carrier to schedule the to-be-scheduled terminal devices in the first scheduling period; and scheduling, by the first carrier, the to-be-scheduled terminal devices based on the sixth transmit power in the first scheduling period.

According to the power sharing method in this embodiment of this application, a maximum transmit power of the first carrier in the second scheduling period is determined based on the fifth transmit power and the initially configured transmit power. In the method for determining a maximum transmit power of each carrier in the transmit power sharing group, reliability of the transmit power sharing in the transmit power sharing group can be improved.

Further, after the maximum transmit power in the first scheduling period is obtained through calculation, the to-be-scheduled terminal devices may be scheduled based on the maximum transmit power, so that scheduling performance can be improved.

With reference to the first aspect and the foregoing implementations of the first aspect, in another implementation of the first aspect, the broadcasting information about the third transmit power to the transmit power sharing group includes: broadcasting the information about the third transmit power to the transmit power sharing group in a first preset time duration; and the receiving information about a fourth transmit power includes: receiving the information about the fourth transmit power in a second preset time duration, where an end moment of the first preset time duration is earlier than or equal to an end moment of the second preset time duration.

According to the power sharing method in this embodiment of this application, a preset information sending duration of the third transmit power and a preset information receiving duration of the fourth transmit power are set, and shared information of the carrier is known when the information about the fourth transmit power is received, thereby ensuring that the actually shared fifth transmit power can be obtained in a timely manner, and reducing the delay.

With reference to the first aspect and the foregoing implementations of the first aspect, in another implementation of the first aspect, after the scheduling the to-be-scheduled terminal devices based on the sixth transmit power, when the first carrier has a remaining seventh transmit power, the method further includes: collecting statistics about a scheduled terminal device that is in the scheduled terminal devices and whose transmit power can be boosted; and using the seventh transmit power for the scheduled terminal devices whose transmit power can be boosted.

According to the power sharing method in this embodiment of this application, after the to-be-scheduled terminal devices are scheduled in the first carrier based on the maximum transmit power, if there is a remaining seventh transmit power that can be used to boost the transmit power, the transmit power of the scheduled terminal devices whose transmit power can be boosted can be boosted.

With reference to the first aspect and the foregoing implementations of the first aspect, in another implementation of the first aspect, the estimating a first transmit power based on a traffic volume of terminal devices to be scheduled in a first carrier in a first scheduling period includes: after completing scheduling the terminal devices in a second scheduling period, estimating the first transmit power based on the traffic volume of the terminal devices to be scheduled in the first carrier in the first scheduling period, where the first scheduling period is a next scheduling period of the second scheduling period.

According to the power sharing method in this embodiment of this application, after the scheduling in the second scheduling period is completed, the first transmit power required in the first carrier in a next scheduling period may be calculated, so that real-time performance of scheduling can be met.

With reference to the first aspect and the foregoing implementations of the first aspect, in another implementation of the first aspect, when the second scheduling period is the initial scheduling period, the completing scheduling the terminal devices in a second scheduling period includes: scheduling the terminal devices based on the initially configured transmit power.

According to the power sharing method in this embodiment of this application, in an initial scheduling period, the scheduling is completed based on the initially configured transmit power, so that the real-time performance of the scheduling can be met.

It should be understood that, when the first scheduling period is the initial scheduling period, each carrier in the transmit power sharing group uses, in the first scheduling period, an initially configured transmit power of the carrier as a maximum transmit power, and a sum of maximum transmit powers of carriers in the transmit power sharing group is not greater than a rated total power of a power amplifier shared by the carriers.

With reference to the first aspect and the foregoing implementations of the first aspect, in another implementation of the first aspect, before the estimating a first transmit power, the method further includes: determining that the first carrier meets a preset condition, and establishing a transmit power sharing group including the first carrier and at least one second carrier.

According to the power sharing method in this embodiment of this application, before the first transmit power required in the first carrier in the first scheduling period is calculated, the transmit power sharing group to which the first carrier belongs is first determined, so that the premise of the transmit power sharing can be met.

With reference to the first aspect and the foregoing implementations of the first aspect, in another implementation of the first aspect, the preset condition includes: supporting, by the first carrier, carrier transmit power sharing, and sharing, by the first carrier and the at least one second carrier, one transmit power amplifier.

According to the power sharing method in this embodiment of this application, the premise for establishing the transmit power sharing group for the first carrier is that the first carrier supports the carrier transmit power sharing and the first carrier and the at least one second carrier share one transmit power amplifier.

With reference to the first aspect and the foregoing implementations of the first aspect, in another implementation of the first aspect, the traffic volume of the to-be-scheduled terminal devices includes: a to-be-scheduled signalling radio bearer and/or a to-be-scheduled data radio bearer.

According to the power sharing method in this embodiment of this application, the traffic volume of the to-be-scheduled terminal devices may be determined by using the to-be-scheduled signalling radio bearer and/or the to-be-scheduled data radio bearer, so that the traffic volume of the to-be-scheduled terminal devices can be accurately calculated.

With reference to the first aspect and the foregoing implementations of the first aspect, in another implementation of the first aspect, the first transmit power required in the first carrier includes: an eighth transmit power required in the first carrier to schedule the to-be-scheduled terminal devices, and a ninth transmit power required in the first carrier to schedule the terminal devices that are in the to-be-scheduled terminal devices and whose transmit power can be boosted.

According to the power sharing method in this embodiment of this application, when the first transmit power required in the first carrier in the second scheduling period is calculated based on the traffic volume of the terminal devices to be scheduled in the first carrier in the second scheduling period, the required first transmit power includes the transmit power occupied by scheduling and a boosting transmit power required by the terminal devices whose transmit power may be boosted. The required first transmit power is divided into two parts, so that the transmit power required for scheduling the terminal devices can be determined.

According to a second aspect, a power sharing method is provided, including: exchanging a sharable transmit power of the first carrier and a sharable transmit power of another carrier in a transmit power sharing group in a broadcast manner to perform transmit power sharing, where the first carrier is any carrier in the transmit power sharing group.

According to the power sharing method in this embodiment of this application, the first carrier and the another carrier in the transmit power sharing group exchange, in the broadcast manner, the sharable transmit power of the first carrier and the sharable transmit power of the another carrier, and each carrier directly broadcasts, in the transmit power sharing group, the sharable transmit power of the carrier, so that all carriers in the transmit power sharing group can directly exchange information about the sharable transmit power. There is no need to configure a scheduler for each carrier in the transmit power sharing group, thereby improving reliability of the transmit power sharing in the transmit power sharing group.

With reference to the second aspect, in some implementations of the second aspect, before calculating the sharable transmit power of the first carrier, the method further includes: estimating a first transmit power based on a traffic volume of terminal devices to be scheduled in the first carrier in a first scheduling period, where the first transmit power is a transmit power required in the first carrier to schedule the to-be-scheduled terminal devices in the first scheduling period; and estimating a second transmit power based on the first transmit power and an initially configured transmit power, where the second transmit power is a remaining transmit power of the first carrier in the first scheduling period.

According to the power sharing method in this embodiment of this application, a remaining second transmit power of the first carrier in the first scheduling period is calculated based on the traffic volume of the to-be-scheduled terminal devices, so that accuracy of transmit power calculation can be improved, and transmit power sharing can be performed based on the second transmit power obtained through calculation, thereby improving accuracy of the transmit power sharing.

It should be understood that the second transmit power may be a positive number, a negative number, or 0.

When the second transmit power is a positive number, it indicates that the first carrier has a remaining transmit power.

When the second transmit power is a negative number, it indicates that the first carrier requires an extra transmit power.

When the second transmit power is 0, it indicates that the first carrier has no remaining transmit power and needs no extra transmit power.

With reference to the second aspect and the foregoing implementations of the second aspect, in another implementation of the first aspect, that the performing transmit power sharing includes: calculating a third transmit power based on the second transmit power and a preset shared transmit power, where the third transmit power is the sharable transmit power of the first carrier in the first scheduling period; broadcasting information about the third transmit power to the transmit power sharing group, where the first carrier is any carrier in the transmit power sharing group, and the transmit power sharing group includes a plurality of carriers; receiving information about a fourth transmit power, where the fourth transmit power is the sharable transmit power of the another carrier, other than the first carrier, in the transmit power sharing group; and calculating a fifth transmit power based on the information about the third transmit power and the information about the fourth transmit power, where the fifth transmit power is an actually shared transmit power of the first carrier in the first scheduling period.

According to the power sharing method in this embodiment of this application, the sharable third transmit power is determined based on the remaining second transmit power obtained through calculation and the preset shared transmit power, the information about the third transmit power is broadcast to the transmit power sharing group, and the another carrier in the transmit power sharing group also broadcast, in the same manner, the information about the sharable fourth transmit power of the another carrier. Each carrier can determine the actually shared fifth transmit power based on the information about the third transmit power and the information about the fourth transmit power.

It should be understood that the first carrier is merely an example, and the first carrier is any carrier in the transmit power sharing group. In other words, it may be understood that any carrier in the transmit power sharing group may determine, based on a sharable transmit power obtained by the carrier through calculation and received information that is broadcast by another carrier in the transmit power sharing group and that is about the sharable transmit power, an actually shared transmit power of the carrier.

It should be further understood that, a carrier in the transmit power sharing group sends, to another carrier in the transmit power sharing group in the broadcast manner, the sharable transmit power of the carrier, which can improve reliability of the message about the sharable transmit power, and reduce a delay in sending the message about the sharable transmit power.

With reference to the second aspect and the foregoing implementations of the second aspect, in another implementation of the second aspect, the method further includes: calculating a sixth transmit power based on the fifth transmit power and the initially configured transmit power, where the sixth transmit power is a maximum transmit power in the first carrier to schedule the to-be-scheduled terminal devices in the first scheduling period; and scheduling the to-be-scheduled terminal devices based on the sixth transmit power in the first scheduling period.

According to the power sharing method in this embodiment of this application, a maximum transmit power of the first carrier in the second scheduling period is determined based on the fifth transmit power and the initially configured transmit power. In the method for determining a maximum transmit power of each carrier in the transmit power sharing group, reliability of the transmit power sharing in the transmit power sharing group can be improved.

Further, after the maximum transmit power in the first scheduling period is obtained through calculation, the to-be-scheduled terminal devices may be scheduled based on the maximum transmit power, so that scheduling performance can be improved.

With reference to the second aspect and the foregoing implementations of the second aspect, in another implementation of the second aspect, the broadcasting information about the third transmit power to the transmit power sharing group includes: broadcasting the information about the third transmit power to the transmit power sharing group in a first preset time duration; and the receiving information about a fourth transmit power includes: receiving the information about the fourth transmit power in a second preset time duration, where an end moment of the first preset time duration is earlier than or equal to an end moment of the second preset time duration.

According to the power sharing method in this embodiment of this application, a preset information sending duration of the third transmit power and a preset information receiving duration of the fourth transmit power are set, and shared information of the carrier is known when the information about the fourth transmit power is received, thereby ensuring that the actually shared fifth transmit power can be obtained in a timely manner, and reducing the delay.

With reference to the second aspect and the foregoing implementations of the second aspect, in another implementation of the second aspect, after the scheduling the to-be-scheduled terminal devices based on the sixth transmit power, when the first carrier has a remaining seventh transmit power, the method further includes: collecting statistics about a scheduled terminal device that is in the scheduled terminal devices and whose transmit power can be boosted; and using the seventh transmit power for the scheduled terminal devices whose transmit power can be boosted.

According to the power sharing method in this embodiment of this application, after the to-be-scheduled terminal devices are scheduled in the first carrier based on the maximum transmit power, if there is a remaining seventh transmit power that can be used to boost the transmit power, the transmit power of the scheduled terminal devices whose transmit power can be boosted can be boosted.

With reference to the second aspect and the foregoing implementations of the second aspect, in another implementation of the second aspect, the estimating a first transmit power based on a traffic volume of terminal devices to be scheduled in a first carrier in a first scheduling period includes: after completing scheduling the terminal devices in a second scheduling period, estimating the first transmit power based on the traffic volume of the terminal devices to be scheduled in the first carrier in the first scheduling period, where the first scheduling period is a next scheduling period of the second scheduling period.

According to the power sharing method in this embodiment of this application, after the scheduling in the second scheduling period is completed, the first transmit power required in the first carrier in a next scheduling period may be calculated, so that real-time performance of scheduling can be met.

With reference to the second aspect and the foregoing implementations of the second aspect, in another implementation of the second aspect, when the second scheduling period is the initial scheduling period, the completing scheduling the terminal devices in a second scheduling period includes: scheduling the terminal devices based on the initially configured transmit power.

According to the power sharing method in this embodiment of this application, in an initial scheduling period, the scheduling is completed based on the initially configured transmit power, so that the real-time performance of the scheduling can be met.

With reference to the second aspect and the foregoing implementations of the second aspect, in another implementation of the second aspect, before the estimating a first transmit power, the method further includes: determining that the first carrier meets a preset condition, and establishing a transmit power sharing group including the first carrier and at least one second carrier.

According to the power sharing method in this embodiment of this application, before the first transmit power required in the first carrier in the first scheduling period is calculated, the transmit power sharing group to which the first carrier belongs is first determined, so that the premise of the transmit power sharing can be met.

With reference to the second aspect and the foregoing implementations of the second aspect, in another implementation of the second aspect, the preset condition includes: supporting, by the first carrier, carrier transmit power sharing, and sharing, by the first carrier and the at least one second carrier, one transmit power amplifier.

According to the power sharing method in this embodiment of this application, the premise for establishing the transmit power sharing group for the first carrier is that the first carrier supports the carrier transmit power sharing and the first carrier and the at least one second carrier share one transmit power amplifier.

With reference to the second aspect and the foregoing implementations of the second aspect, in another implementation of the second aspect, the traffic volume of the to-be-scheduled terminal devices includes: a to-be-scheduled signalling radio bearer and/or a to-be-scheduled data radio bearer.

According to the power sharing method in this embodiment of this application, the traffic volume of the to-be-scheduled terminal devices may be determined by using the to-be-scheduled signalling radio bearer and/or the to-bescheduled data radio bearer, so that the traffic volume of the to-be-scheduled terminal devices can be accurately calculated.

With reference to the second aspect and the foregoing implementations of the second aspect, in another implementation of the second aspect, the first transmit power required in the first carrier includes: an eighth transmit power required in the first carrier to schedule the to-be-scheduled terminal devices, and a ninth transmit power required in the first carrier to schedule the terminal devices that is in the to-be-scheduled terminal devices and whose transmit power can be boosted.

According to the power sharing method in this embodiment of this application, when the first transmit power required in the first carrier in the second scheduling period is calculated based on the traffic volume of the terminal devices to be scheduled in the first carrier in the second scheduling period, the required first transmit power includes the transmit power occupied by scheduling and a transmit power required by the terminal devices whose transmit power may be boosted. The required first transmit power is divided into two parts, so that one of the parts can be determined to be the transmit power required for scheduling the terminal devices.

According to a third aspect, a power sharing apparatus is provided. The apparatus may be configured to perform operations in the first aspect or the second aspect and any possible implementation of the first aspect or the second aspect. The power sharing apparatus includes a corresponding component configured to perform the operations or functions described in the first aspect, and the component may be the first carrier in the first aspect or the second aspect. The operations or functions may be implemented by using software, hardware, or a combination of hardware and software.

According to a fourth aspect, a power sharing apparatus is provided, including a processor and a memory, where the memory is configured to store a computer program, and the processor is configured to: invoke the computer program from the memory and run the computer program, so that the power sharing apparatus performs the power sharing method in any possible implementation of the first aspect or the second aspect.

Optionally, there are one or more processors and one or more memories.

Optionally, the memory may be integrated with the processor, or the memory and the processor are separately disposed.

Optionally, the power sharing apparatus further includes a transmitter and a receiver.

In an embodiment, the power sharing apparatus is provided, including a transceiver, the processor, and the memory. The processor is configured to control the transceiver to receive and send a signal. The memory is configured to store the computer program. The processor is configured to invoke the computer program from the memory and run the computer program, so that the power sharing apparatus performs the method in the first aspect or the second aspect and any possible implementation of the first aspect or the second aspect.

According to a fifth aspect, a system is provided. The system includes the foregoing power sharing apparatus.

According to a sixth aspect, a computer program product is provided. The computer program product includes a computer program (which may also be referred to as code or an instruction). When the computer program is run, a computer is enabled to perform the method in any possible implementation of the first aspect or the second aspect.

According to a seventh aspect, a computer-readable medium is provided. The computer-readable medium stores a computer program (which may also be referred to as code or an instruction). When the computer program runs on a computer, the computer is enabled to perform the method in any possible implementation of the first aspect or the second aspect.

According to an eighth aspect, a chip system is provided, including a memory and a processor, where the memory is configured to store a computer program, and the processor is configured to: invoke the computer program from the memory and run the computer program, so that a power sharing apparatus that is installed with the chip system performs the method in any possible implementation of the first aspect or the second aspect.

According to the power sharing method and the power sharing apparatus in the embodiments of this application, a remaining transmit power in a scheduling period is calculated based on the traffic volume of the to-be-scheduled terminal devices, so that accuracy of transmit power calculation can be improved, thereby improving accuracy of transmit power sharing.

DESCRIPTION OF EMBODIMENTS

First, several basic concepts in this application are described.

A transmit power sharing-out carrier means that in a scheduling period in which the carrier schedules terminal devices, the carrier shares a remaining transmit power with another carrier, where the carrier and the another carrier belong to a same transmit power sharing group.

A transmit power sharing-in carrier means that in a scheduling period in which the carrier schedules terminal devices, the carrier shares a remaining transmit power of another carrier, where the carrier and the another carrier belong to a same transmit power sharing group.

A transmit power non-sharing carrier means that in a scheduling period in which the carrier schedules terminal devices, the carrier does not share a remaining transmit power of another carrier, where the carrier and the another carrier belong to a same transmit power sharing group, and no remaining transmit power of the carrier is shared to the another carrier that belongs to the same transmit power sharing group.

The following describes technical solutions of this application with reference to the accompanying drawings.

The technical solutions of the embodiments of this application may be applied to various communications systems, for example, a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a 5th generation (5G) system, or a new radio (NR).

Figure 1:
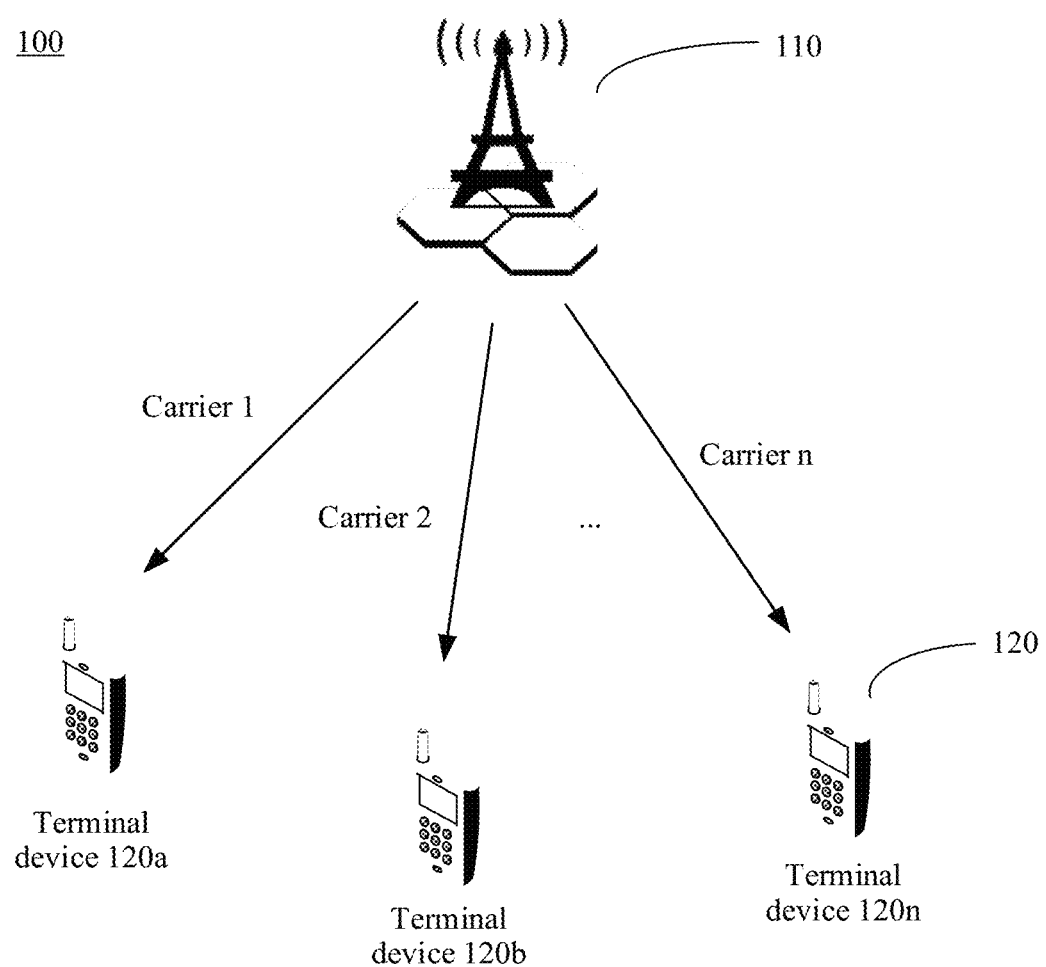
FIG. 1 is a schematic diagram of a communications system applicable to a power sharing method in an embodiment of this application.

For ease of understanding the embodiments of this application, a communications system applicable to the embodiments of this application is described in detail with reference to FIG. 1. FIG. 1 is a schematic diagram of a communications system 100 applicable to a power sharing method in an embodiment of this application.

As shown in FIG. 1, the communications system 100 includes a network device 110, and the network device 110 may include a plurality of antennas. In addition, the network device 110 may additionally include a transmitter chain and a receiver chain. A person of ordinary skill in the art may understand that both the transmitter chain and the receiver chain may include a plurality of components (such as a processor, a modulator, a multiplexer, a demodulator, a demultiplexer, or an antenna) related to signal sending and receiving.

It should be understood that the network device may be any device that has a wireless transceiver function or a chip that can be disposed in the device. The device includes but is not limited to a network device (BTS) in a global system for mobile communications (GSM) or in code division multiple access (CDMA), or may be a NodeB (NB) in a wideband code division multiple access (WCDMA) system, or an evolved NodeB (eNB, or eNodeB) in an LTE system, or a radio controller in a cloud radio access network CRAN) scenario, or the network device may be a relay station, an access point, a vehicle-mounted device, a wearable device, a network device in a 5G network, a network device in a evolved PLMN network, or the like. This is not limited in the embodiments of this application.

The network device 110 may communicate with a plurality of terminal devices (for example, a terminal device 120a to a terminal device 120n). The network device 110 may communicate with any quantity of terminal devices similar to the terminal device 120a.

The communications system 100 further includes a terminal device 120 (the terminal device 120a to the terminal device 120n shown in FIG. 1), and the terminal device 120 may also include a plurality of antennas. In addition, the terminal device 110 may additionally include a transmitter chain and a receiver chain. A person of ordinary skill in the art may understand that both the transmitter chain and the receiver chain may include a plurality of components (such as a processor, a modulator, a multiplexer, a demodulator, a demultiplexer, or an antenna) related to signal sending and receiving.

It should be understood that the terminal device may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device in the embodiments of this application may be a mobile phone, a tablet (Pad), a computer having a wireless transceiver function, a virtual reality (VR) terminal device, an augmented reality (AR) terminal device, a wireless terminal in industrial control, a wireless terminal in self driving, a wireless terminal in telemedicine, a wireless terminal in a smart grid, a wireless terminal in transportation safety, a wireless terminal in a smart city, a wireless terminal in a smart home, or the like. An application scenario is not limited in the embodiments of this application. In this application, the foregoing terminal device and a chip that can be disposed in the foregoing terminal device are collectively referred to as a terminal device.

In the embodiments of this application, the terminal device or the network device includes a hardware layer, an operating system layer running on the hardware layer, and an application layer running on the operating system layer. The hardware layer includes hardware such as a central processing unit (CPU), a memory management unit (MMU), and a memory (also referred to as a main memory). The operating system may be any one or more computer operating systems that implement service processing by using a process, for example, a Linux operating system, a Unix operating system, an Android operating system, an iOS operating system, or a Windows operating system. The application layer includes applications such as a browser, an address book, word processing software, and instant communications software. In addition, a specific structure of an execution body of the method provided in the embodiments of this application is not limited in the embodiments of this application, provided that a program that records code of the method provided in the embodiments of this application can be run to perform communication according to the method provided in the embodiments of this application. For example, the execution body of the method provided in the embodiments of this application may be the terminal device or the network device, or a function module that can invoke and execute the program in the terminal device or the network device.

In addition, aspects or features of this application may be implemented as a method, an apparatus, or a product that uses standard programming and/or engineering technologies. The term "product" used in this application covers a computer program that can be accessed from any computer-readable component, carrier or medium. For example, the computer-readable medium may include but is not limited to: a magnetic storage component (for example, a hard disk, a floppy disk, or a magnetic tape), an optical disc (for example, a compact disc (CD) or a digital versatile disc (DVD)), a smart card and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable storage media" may include but is not limited to a radio channel, and various other media that can store, include, and/or carry an instruction and/or data.

As shown in FIG. 1, the network device 110 communicates with the terminal device 120 by using a carrier. The network device 110 communicates with the terminal device 120a by using a carrier 1, the network device 110 communicates with a terminal device 120b by using a carrier 2, and the network device 110 communicates with the terminal device 120n by using a carrier n.

This embodiment of this application is applicable to downlink data transmission in the communications system 100. A plurality of carriers share one transmit power amplifier.

For example, the carrier 1, the carrier 2, and the carrier n share one transmit power amplifier (PA) PA 1.

In addition, the communications system 100 may be a public land mobile network (PLMN), a device-to-device (D2D) network, a machine-to-machine (M2M) network, or another network. FIG. 1 is merely a simplified schematic diagram of an example used for ease of understanding, and the network may further include another network device or another terminal device that is not shown in FIG. 1.

With development of the mobile communications technology and popularization of the multi-frequency radio remote unit (RRU), an increasing quantity of network devices 110 implement a scenario in which a same PA is configured with a plurality of carriers.

Each carrier can use only a maximum transmit power statically configured by the network device 110 for the carrier. Therefore, when the terminal device 120 is scheduled on the carrier, the scheduling is limited by the maximum transmit power.

In a mobile communications system, a transmit power is related to coverage, a capacity, and costs of a system. If the transmit power of the carrier cannot meet a requirement of the terminal device 120, experience of the terminal device 120 deteriorates. On the contrary, if the transmit power of the carrier is greater than the requirement of the terminal device 120, a waste of the transmit power is caused.

Therefore, without increasing costs, dynamic transmit power sharing between carriers is used to improve a capacity and PA usage efficiency of the communications system.

The dynamic transmit power sharing between carriers includes: allowing a carrier that requires a high transmit power to use a remaining transmit power of a carrier that requires a low transmit power.

Figure 2:
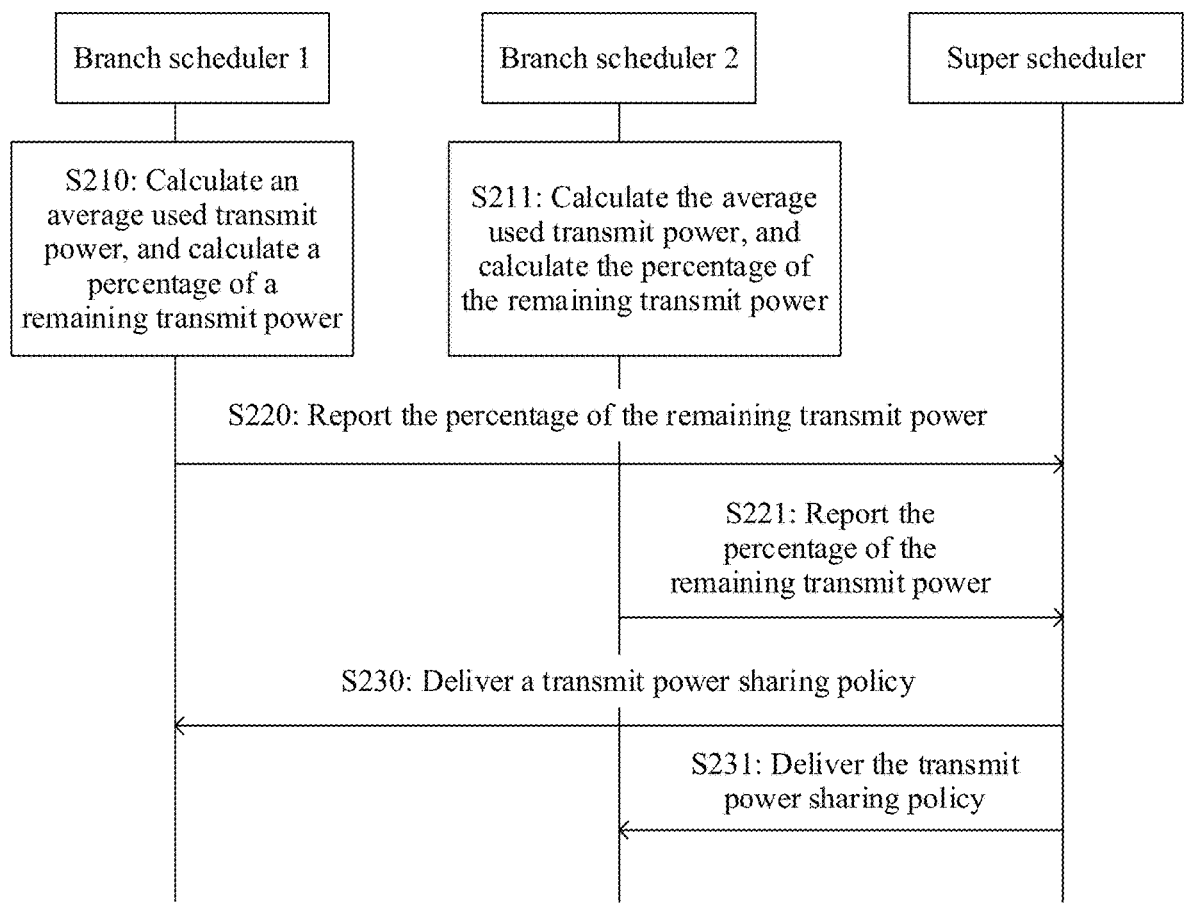
FIG. 2 is a schematic diagram of a method of dynamic transmit power sharing between carriers.
Figure 3:
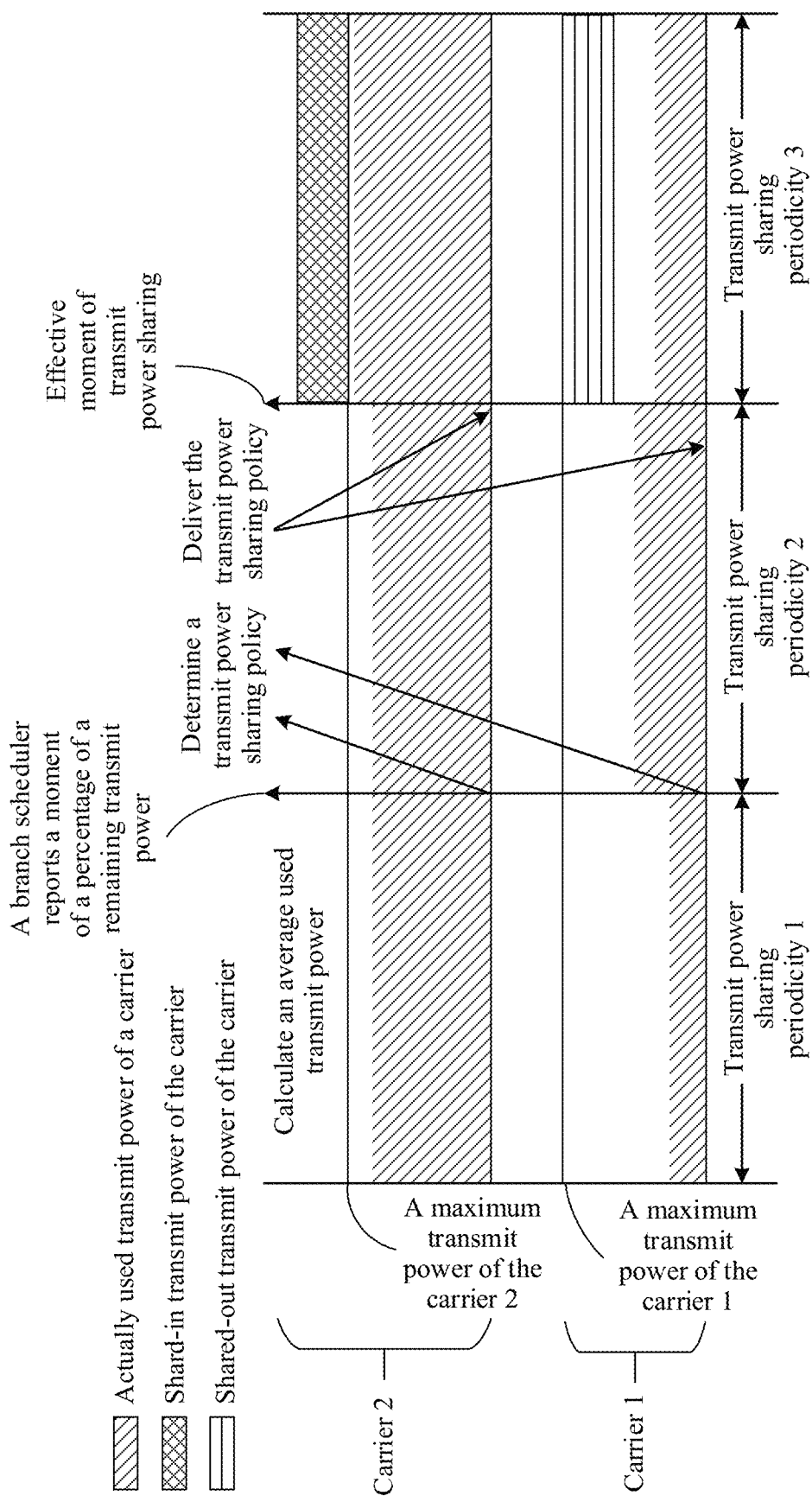
FIG. 3 is a schematic diagram of a time window of dynamic transmit power sharing between carriers.

With reference to FIG. 2 and FIG. 3, the following briefly describes a method of dynamic transmit power sharing between carriers in the prior art.

FIG. 2 is a schematic diagram of a method of dynamic transmit power sharing between carriers. The schematic diagram includes a super scheduler, a branch scheduler 1, and a branch scheduler 2, and further includes six operations: S210 to S231.

The following describes the six operations in detail with reference to FIG. 2 and FIG. 3.

The branch scheduler 1 corresponds to a carrier 1, the branch scheduler 2 corresponds to a carrier 2, and the super scheduler corresponds to a PA, and is configured to coordinate transmit powers of a plurality of carriers that share one PA.

S210: The branch scheduler 1 calculates an average transmit power used by the carrier 1, and calculates a percentage of a remaining transmit power of the carrier 1.

For example, FIG. 3 is a schematic diagram of a time window of dynamic transmit power sharing between carriers. As shown in FIG. 3, in a transmit power sharing period 1, the branch scheduler 1 may calculate, based on transmit power usage of the carrier 1, a percentage of the average transmit power used by the carrier 1 in an initially configured transmit power, and calculate, based on the obtained percentage of the average used transmit power in the initially configured transmit power, a percentage of the remaining transmit power of the carrier 1.

For example, if the initially configured transmit power of the carrier 1 is A1, and the average transmit power used in the transmit power sharing period 1 is a1, the percentage of the average used transmit power in the initially configured transmit power is $(a1/A1)*100\%$, and the percentage of the remaining transmit power of the carrier 1 is $1-(a1/A1)*100\%$.

S211: The branch scheduler 2 calculates an average transmit power used by the carrier 2, and calculates a percentage of a remaining transmit power of the carrier 2.

For example, as shown in FIG. 3, in the transmit power sharing period 1, a percentage of the average used transmit power in the initially configured transmit power may be calculated based on transmit power usage of the carrier 2, and a percentage of the remaining transmit power may be calculated based on the obtained percentage of the average used transmit power in the initially configured transmit power.

For example, if the initially configured transmit power of the carrier 2 is B1, and the average transmit power used in the transmit power sharing period 1 is b1, the percentage of the average used transmit power in the initially configured transmit power is $(b1/B1)*100\%$, and the percentage of the remaining transmit power of the carrier 2 is $1-(b1/B1)*100\%$.

S220: The branch scheduler 1 reports the percentage of the remaining transmit power of the carrier 1.

For example, the branch scheduler shown in FIG. 3 reports a moment of the percentage of the remaining transmit power. The branch scheduler 1 reports, to the super scheduler, the percentage of the remaining transmit power of the carrier 1.

S221: The branch scheduler 2 reports the percentage of the remaining transmit power of the carrier 2.

For example, the branch scheduler shown in FIG. 3 reports a moment of the percentage of the remaining transmit power. The branch scheduler 2 reports, to the super scheduler, the percentage of the remaining transmit power of the carrier 2.

S230: The super scheduler delivers a transmit power sharing policy to the branch scheduler 1.

The super scheduler sets the transmit power sharing policy for all branch schedulers and delivers the transmit power sharing policy to the branch scheduler 1. The branch scheduler 1 schedules, in a next transmit power sharing period, a user based on the received transmit power sharing policy.

S231: The super scheduler delivers the transmit power sharing policy to the branch scheduler 2.

The super scheduler sets the transmit power sharing policy for all the branch schedulers and delivers the transmit power sharing policy to the branch scheduler 2. The branch scheduler 2 schedules, in a next transmit power sharing period, the user equipment based on the received transmit power sharing policy.

For example, after the super scheduler shown in FIG. 3 delivers the transmit power sharing policy to the branch scheduler 1 and the branch scheduler 2, the carrier 1 and the carrier 2 schedule, at an effective moment of the transmit power sharing, and in a transmit power sharing period 3, the user equipment based on the received transmit power sharing policy.

The transmit power sharing policy may be that, the carrier 2 in which the percentage of the remaining transmit power is less than a preset first threshold shares, in the transmit power sharing period 3, the remaining transmit power of the carrier 1 in which the percentage of the remaining transmit power is greater than a preset second threshold.

The method of dynamic transmit power sharing between carriers shown in FIG. 2 and FIG. 3 includes the following operations.

First, the super scheduler sets the transmit power sharing policy based on the percentage of the remaining transmit power reported by the branch scheduler, and the foregoing percentage of the remaining transmit power is determined based on a percentage of a remaining transmit power of each carrier in a previous period. Therefore, for a next period, the historical basis lags behind. Consequently accuracy of predicting a transmit power requirement in the prior art is relatively low.

Second, because the super scheduler is used to determine the sharing policy for all the branch schedulers, reliability of determining the sharing policy in the centralized manner depends on the super scheduler. Once the super scheduler is faulty, transmit power sharing between carriers cannot be performed at all. Therefore, reliability of the prior art is relatively low.

In addition, from obtaining usage information of a transmit power of a corresponding carrier to receiving the sharing policy sent by the super scheduler, each branch scheduler needs at least twice a transmission delay between the branch scheduler and the super scheduler. Therefore, a message interaction delay in the prior art is relatively long.

To resolve the foregoing problem, this application provides a power sharing method.

With reference to FIG. 4 to FIG. 8, the following describes in detail a power sharing method provided in this application.

Figure 4:
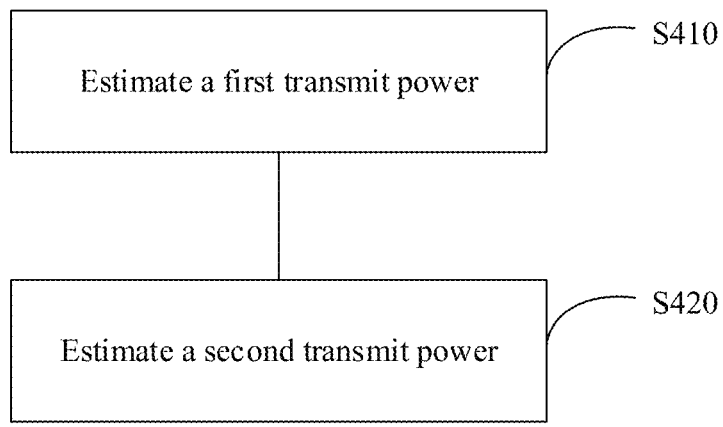
FIG. 4 is a schematic diagram of a power sharing method according to an embodiment of this application.

FIG. 4 is a schematic diagram of a power sharing method according to an embodiment of this application. The method includes S410 and S420.

S410: Estimate a first transmit power.

The first transmit power is estimated based on a traffic volume of terminal devices to be scheduled in a first carrier in a first scheduling period, where the first transmit power is a transmit power required in the first carrier to schedule the to-be-scheduled terminal devices in the first scheduling period.

Optionally, in some embodiments, the traffic volume of the to-be-scheduled terminal devices may be determined by using a to-be-scheduled signalling radio bearer and/or a to-be-scheduled data radio bearer.

The following uses an example in which the first carrier is a carrier 1, to describe how to estimate the first transmit power of the carrier 1.

An example in which the carrier 1 estimates, based on the traffic volume of the to-be-scheduled terminal devices, the first transmit power required in the carrier 1 in the first scheduling period is used to describe in detail a procedure of estimating the transmit power required in the first carrier in the first scheduling period in S410.

Figure 5:
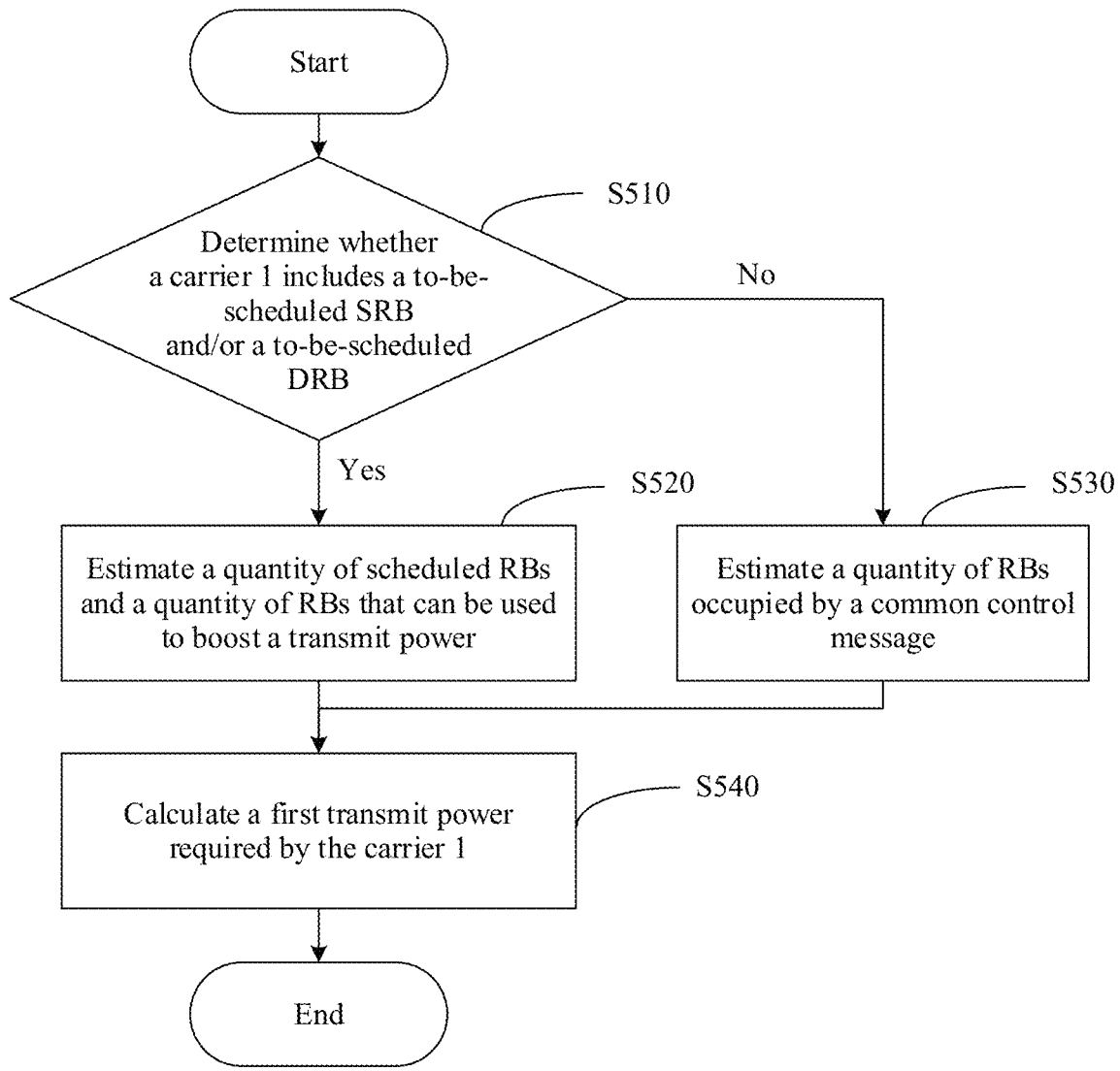
FIG. 5 is a schematic flowchart of estimating a first transmit power.

FIG. 5 is a schematic flowchart of estimating a first transmit power. The method includes four operations: S510 to S540.

S510: Determine whether the carrier 1 further includes a to-be-scheduled signalling radio bearer (SRB) and/or a to-be-scheduled data radio bearer (DRB).

If the carrier 1 further includes the to-be-scheduled SRB or the to-be-scheduled DRB, S520 is performed.

If the carrier 1 does not include the to-be-scheduled SRB or the to-be-scheduled DRB, S530 is performed.

Optionally, in some embodiments, that the first transmit power is estimated based on a traffic volume of terminal devices to be scheduled in a first carrier in a first scheduling period includes:

after completing scheduling the terminal devices in a second scheduling period, estimating the first transmit power based on the traffic volume of the terminal devices to be scheduled in the first carrier in the first scheduling period, where the first scheduling period is a next scheduling period of the second scheduling period.

In this case, the determining whether the carrier 1 further includes a to-be-scheduled SRB and/or a to-be-scheduled DRB may be performed after the scheduling of the terminal devices is completed in the second scheduling period.

Optionally, the second scheduling period may be an initial scheduling period, and the carrier 1 schedules the terminal devices based on an initial transmit power configured by a network device for the carrier 1.

Optionally, the first scheduling period may be an initial scheduling period, and the carrier 1 schedules the terminal devices based on the initial transmit power configured by the network device for the carrier 1.

S520: Calculate, based on the to-be-scheduled SRB or the to-be-scheduled DRB further included in the carrier 1, a total quantity of RBs ($N_{RB\_Use\_Est}^{i}$) occupied when the carrier 1 schedules the terminal devices in the first scheduling period and a quantity of RBs ($N_{RB\_Lift\_Est}^{i}$) occupied when the carrier 1 schedules to-be-scheduled terminal devices whose transmit power can be boosted in the first scheduling period.

The total quantity of RBs occupied when the carrier 1 schedules the terminal devices is related to scheduling types of the terminal devices.

The scheduling types of the terminal devices scheduled in the carrier 1 may include: semi-persistently scheduling, control message scheduling, hybrid automatic repeat request (HARQ) retransmission scheduling, and dynamic initial transmission scheduling.

Optionally, the semi-persistently scheduling occupies a fixed time-frequency resource. For an activated semi-persistently scheduled terminal device, it is determined whether the first scheduling period is a scheduling period of the semi-persistently scheduled terminal device.

If the first scheduling period is the scheduling period of the semi-persistently scheduled terminal device, transmit power requirement information of the terminal device and a sharable transmit power of the carrier 1 are estimated based on a quantity of RBs allocated to the terminal device.

If the first scheduling period is not the scheduling period of the semi-persistently scheduled terminal device, semi-persistently scheduled terminal devices to be activated or reactivated are traversed in descending order of waiting time lengths of the terminal devices.

If currently, utilization of a semi-persistently scheduled RB does not reach an upper limit, or a quantity of semi-persistently activated terminal devices does not reach an upper limit, and the terminal device currently has valid channel quality information (CQI) to report, a quantity of RBs of terminal devices to be activated or reactivated is estimated.

Optionally, the control message scheduling includes common control message scheduling and terminal-device-level control message scheduling.

A common control message includes a broadcast message, a paging message, and a random access reply message.

A terminal-device-level control message includes a signalling radio bearer 0 (SRB 0), a signalling radio bearer 1 (SRB 1), and a signalling radio bearer 2 (SRB 2).

A periodicity of the broadcast message is 20 ms, a quadrature phase shift keying (QPSK) modulation mode is used, and the broadcast message is scheduled in a fixed subframe.

The paging message is related to a quantity of paging terminal devices, and the quantity of paging terminal devices in a next scheduling period is determined based on a paging frame and a paging occasion that are of each paging terminal device.

The random access reply message and the SRB 0 may be obtained by scanning a common control channel (CCCH) linked list, to determine whether a random access response (RAR) message and the SRB 0 need to be sent.

It is determined whether the first scheduling period is a scheduling period of the broadcast message, the paging message, the random access reply message, or the SRB 0.

If the first scheduling period is the scheduling period of the broadcast message, the paging message, the random access reply message, or the SRB 0, the quantity of RBs occupied for scheduling the terminal devices is calculated according to the following formula:

$$\text{ceil}\left(\frac{TBS_{control} + TB\_CRC + CB\_CRC}{M \times CR_{control} \times N_{RE\_Data}^{RB}}\right).$$

In the foregoing formula, $TBS_{control}$ is a transport block size (TBS) of a control message, TB_CRC is a transport block cyclic redundancy code (CRC) check bit, CB_CRC is a code block CRC check bit, M is a modulation order, $C_{Rcontrol}$ is a bit rate of the control message, and $N_{RE\_Data}^{RB}$ is a quantity of resource elements (RE) used for data transmission in each RB.

The SRB 1 and the SRB 2 may be obtained by scanning a dedicated control channel (DCCH) linked list, to determine whether there is a data volume of the SRB 1 and the SRB 2.

If there is a data volume of the SRB 1 and the SRB 2, processing is performed based on dynamic initial transmission scheduling. For an estimated quantity of RBs occupied when the control message is used to schedule the terminal devices, refer to the dynamic initial transmission scheduling.

The HARQ retransmission scheduling needs to check whether a terminal device that is to perform retransmission exists in a retransmission chain of the second scheduling period. If a terminal device that is to perform retransmission exists in the retransmission chain of the second scheduling period, a quantity of RBs occupied for scheduling the terminal device that is to perform retransmission needs to be estimated.

If a last feedback of a retransmission transport block (TB) is discontinuous transmission (DTX) or the network service protocol (NSP), a retransmission MCS is consistent with that of initial transmission.

If a last feedback of a retransmission TB is a negative acknowledgment (NACK), a retransmission MCS is a value that is output to retransmission scheduling after the current CQI is adjusted. A quantity of RBs required for the retransmission TB can be obtained by querying the table based on a retransmission TB size and the MCS.

Optionally, the dynamic initial transmission scheduling estimates, based on a remaining radio link control (RLC) buffer data volume of the terminal devices to be scheduled in the carrier 1 and an MCS for initial transmission in the second scheduling period, a quantity of RBs required for initially transmitting data in the first scheduling period. A calculation formula is as follows:

$$\sum_{k=1}^{K} \text{ceil}\left(\frac{RLC_{Buffer}^{k}}{N_{RE\_Data}^{RB} \times \eta_k}\right),$$

where

K is a quantity of the terminal devices to be scheduled in the carrier 1 after the second scheduling period, $RLC_{Buffer}^{k}$ is a remaining RLC Buffer data volume of the to-be-scheduled terminal devices k after the second scheduling period, $N_{RE\_Data}^{RB}$ is a quantity of REs used for data transmission in each RB, and $\eta_k$ is spectral efficiency of to-be-scheduled terminal devices k.

If the terminal device is in the second scheduling period, the spectral efficiency is spectral efficiency to which the MCS in the second scheduling period is mapped. If the terminal device is not scheduled in the second scheduling period, the spectral efficiency is spectral efficiency to which the MCS is mapped, where the MCS is obtained after the CQI reported by the terminal device in the second scheduling period is adjusted.

It should be understood that, in the foregoing process of estimating the quantity of RBs occupied for scheduling the terminal device in each scheduling type, it is determined whether a to-be-scheduled terminal device is a terminal device whose transmit power can be boosted. If a to-be-scheduled terminal device is a terminal device whose transmit power can be boosted, a quantity of RBs required for scheduling the terminal device whose transmit power can be boosted is accumulated to a quantity, calculated by the carrier 1, of RBs $N_{RB\_Lift\_Est}^{1}$ that can be used to boost the transmit power. If the estimated quantity of occupied RBs $N_{RB\_Use\_Est}^{1}$ is greater than the total quantity of RBs $N_{RB}^{1}$ available for the carrier 1, estimating the quantity of RBs is stopped, and $N_{RB\_Use\_Est}^{1}$ is set to the total quantity of RBs available for the carrier 1, that is, $N_{RB\_Use\_Est}^{1} = N_{RB}^{1}$.

S530: Estimate a quantity of RBs occupied by the common control message scheduling in the first scheduling period.

For the estimated quantity of RBs occupied by the common control message scheduling, refer to operation S520. Details are not described herein again.

S540: Calculate, based on the estimated quantity of RBs occupied for scheduling the terminal devices and the quantity of RBs that can be used to boost the transmit power, the first transmit power required in the carrier 1.

The transmit power occupied for scheduling the terminal devices is first calculated based on the estimated quantity of RBs occupied for scheduling the terminal devices and the transmit power allocated by each RB:

$$P_{Use\_Est}^{1} = \sum_{n=1}^{N_{RB\_Use\_Est}^{1}} p_{RB\_Use}^{n}.$$

Then, a maximum boosted transmit power is calculated based on the quantity of RBs that can be used to boost the transmit power and a maximum boosted transmit power per RB:

$$P_{Lift\_Est}^{1} = \sum_{n=1}^{N_{RB\_Lift\_Est}^{1}} p_{RB\_Lift}^{n}, \text{ where}$$

$P_{RB\_Use}^{n}$ is a transmit power allocated by $RB_n$, and is calculated based on PA and PB values of the terminal device to which the RB belongs. $P_{RB\_Lift}^{n}$ is a maximum boosted transmit power of $RB_n$, and is determined based on a scheduling type and a modulation scheme of the user equipment to which the RB belongs.

It should be understood that, that the first transmit power required in the first carrier in the first scheduling period is calculated based on the traffic volume of the to-be-scheduled terminal devices shown in FIG. 5 is only a specific implementation, and cannot limit the protection scope of this application. Another solution of calculating the first transmit power based on the traffic volume of the to-be-scheduled terminal devices also falls in the protection scope of this application.

S420: Estimate a second transmit power.

The second transmit power is estimated based on the first transmit power and the initially configured transmit power, where the second transmit power is a remaining transmit power of the first carrier in the first scheduling period.

Optionally, in some embodiments, the first transmit power includes: an eighth transmit power required in the first carrier to schedule the to-be-scheduled terminal devices, and a ninth transmit power required in the first carrier to schedule the terminal devices that are in the to-be-scheduled terminal devices and whose transmit power can be boosted.

The eighth transmit power is the transmit power that is occupied for scheduling the terminal devices and that is calculated based on the quantity of RBs occupied for scheduling the terminal devices and the transmit power allocated by each RB in S540.

The ninth transmit power is the maximum boosted transmit power calculated based on the quantity of RBs that can be used to boost the transmit power and the maximum boosted transmit power per RB in S540.

The foregoing carrier 1 is used as an example to estimate the second transmit power of the carrier 1.

A sum of the transmit power $P_{Use\_Est}^1$ occupied for scheduling the terminal devices and the maximum boosted transmit power $P_{Lift\_Est}^1$ is compared with the initially configured transmit power $P_{CFG}^1$ of the carrier 1:

If $(P_{USe\_Est}^1+P_{Lift\_Est}^1)<P_{CFG}^1$, the carrier 1 has a remaining transmit power, the carrier 1 is referred to as a transmit power sharing-out carrier, and the remaining transmit power is $$P_{Remain\_Est}^1=P_{CFG}^1-P_{Use_{Est}}^1-P_{Lift_{Est}}^1.$$

If $(P_{Use\_Est}^1+P_{Lift\_Est}^1)>P_{CFG}^1$, the carrier 1 has an additional requirement for the transmit power, the carrier 1 is referred to as a transmit power sharing-in carrier, and the additional required transmit power is $$P_{Request\_Est}^1=P_{Use\_Est}^1+P_{Lift\_Est}^1-P_{CFG}^1.$$

If $(P_{Use\_Est}^1+P_{Lift\_Est}^1)=P_{CFG}^1$, the carrier 1 has no remaining transmit power, the carrier 1 has no additional requirement for the transmit power, and the carrier 1 is referred to as an unsolicited sharing carrier.

It should be understood that both the foregoing remaining transmit power and the additional required transmit power $P_{request\_Est}^1$ may be referred to as a remaining second transmit power of the first carrier.

When the carrier 1 has an additional required transmit power, the second transmit power of the carrier 1 is a negative number.

When the carrier 1 has a remaining transmit power, the second transmit power of the carrier 1 is a positive number.

When the carrier 1 has no remaining transmit power, and the carrier 1 has no additional requirement for the transmit power, the second transmit power of the carrier 1 is 0.

Optionally, in some embodiments, the first carrier and another carrier in a transmit power sharing group exchange, in a broadcast manner, a sharable transmit power of the first carrier and a sharable transmit power of the another carrier, to perform transmit power sharing, where the first carrier is any carrier in the transmit power sharing group.

It should be understood that, in this embodiment of this application, when carriers in the transmit power sharing group perform the transmit power sharing, each carrier broadcasts, in the transmit power sharing group, a sharable transmit power of the carrier, so that all carriers in the group can learn of the sharable transmit power of each carrier in the transmit power sharing group, thereby improving efficiency and reliability of transmit power sharing.

Further, the sharable transmit power of each carrier in the transmit power sharing group may be obtained through calculation based on the second transmit power.

For example, a third transmit power is calculated based on the second transmit power and a preset shared transmit power, where the third transmit power is the sharable transmit power of the first carrier in the first scheduling period.

For example, the foregoing carrier 1 is used as an example to calculate the sharable transmit power of the carrier 1.

If the carrier 1 is a transmit power sharing-out carrier, a calculation formula for calculating the sharable transmit power of the carrier 1 is as follows:

$$P_{ShareOut\_Est}^1=\mathrm{Min}\{P_{Remain\_Est}^1,P_{ShareOut\_Max}^1\},$$
where $P_{ShareOut\_Max}^1$ is a maximum sharable transmit power of the carrier 1, and is a product of a preset maximum sharing-out amplitude ratio $\lambda_{CFG}^1$ and the initially configured transmit power $P_{CFG}^1$ of the carrier 1, that is, $P_{ShareOut\_Max}^1=P_{CFG}^1\times\lambda_{CFG}^1$.

It should be understood that, the setting of the maximum sharing-out amplitude ratio needs to ensure that the remaining transmit power of the carrier 1 can meet a requirement of transmitting a necessary signal such as a pilot signal.

The carrier 1 needs to calculate a transmit power occupied by a cell-specific reference signal (CRS) on a physical downlink control channel (PDCCH) symbol 0, a transmit power occupied by a physical control format indicator channel (PCFICH), and a transmit power occupied by a (PHICH). The maximum sharing-out amplitude ratio of the carrier 1 needs to meet the following formula:

$$\lambda_{CFG}^1 \le \left(1 - \frac{P_{CRS}^1 + P_{PCFICH}^1 + P_{PHICH}^1}{P_{CFG}^1}\right).$$

If the carrier 1 is a transmit power sharing-in carrier, a calculation formula for calculating the sharable transmit power of the carrier 1 is as follows:

$$P_{ShareIn\_Est}^1=\mathrm{Min}\{P_{Request\_Est}^1,P_{ShareIn\_Max}^1\},\text{ where}$$

$P_{ShareIn\_Max}^1$ is a maximum sharable transmit power of the carrier 1, and is a product of a preset maximum sharing-in amplitude ratio $\rho_{CFG}^1$ and the initially configured transmit power $P_{CFG}^1$ of the carrier, that is, $P_{ShareIn\_Max}^1=P_{CFG}^1\times\rho_{CFG}^1$.

Optionally, when the carrier 1 is a transmit power sharing-out carrier, the sharable transmit power of the carrier 1 is referred to as a sharing-out transmit power. When the carrier 1 is a transmit power sharing-in carrier, the sharable transmit power of the carrier 1 is referred to as a sharing-in transmit power.

When the carrier 1 is a transmit power sharing-out carrier, it may be understood that a sharing type of the carrier 1 is the transmit power sharing-out carrier described above.

When the carrier 1 is a transmit power sharing-in carrier, it may be understood that a sharing type of the carrier 1 is the transmit power sharing-in carrier described above.

It should be understood that both the foregoing sharing-out transmit power $P_{ShareOut\_Est}^1$ and sharing-in transmit power $P_{ShareIn\_Est}^1$ may be referred to as a sharable third transmit power of the first carrier, and the foregoing maximum sharing-out transmit power $P_{ShareOut\_Max}^1$ and maximum sharing-in transmit power $P_{ShareIn\_Max}^1$ may be referred to as a preset shared transmit power of the first carrier.

When the carrier 1 is a transmit power sharing-out carrier, the third transmit power of the carrier 1 is a positive number.

When the carrier 1 is a transmit power sharing-in carrier, the third transmit power of the carrier 1 is a negative number.

It should be understood that, in this application, when the carriers in the transmit power sharing group perform transmit power sharing, the sharable transmit power of each carrier is not limited to be definitely obtained through calculation based on the second transmit power, or as described in the foregoing FIG. 2 and FIG. 3, the sharable transmit power of each carrier may be calculated based on the historical usage of the transmit power of the carrier.

In other words, the power sharing method provided in the embodiments of this application may be directly applied to the method of dynamic transmit power sharing between carriers shown in the foregoing FIG. 2 and FIG. 3, and information transmission does not need to be performed by using a branch scheduler, instead, each carrier directly broadcasts, in the transmit power sharing group, the sharable transmit power of the carrier.

Optionally, in some embodiments, information about the third transmit power is broadcast to the transmit power sharing group, where the first carrier is any carrier in the transmit power sharing group, and the transmit power sharing group includes a plurality of carriers. Information about a fourth transmit power is received, where the fourth transmit power is a sharable transmit power of another carrier, other than the first carrier, in the transmit power sharing group.

Optionally, in some embodiments, a fifth transmit power is calculated based on the information about the third transmit power and the information about the fourth transmit power, where the fifth transmit power is an actually shared transmit power of the first carrier in the first scheduling period.

A sixth transmit power is calculated based on the fifth transmit power and the initially configured transmit power, where the sixth transmit power is a maximum transmit power in the first carrier to schedule the to-be-scheduled terminal devices in the first scheduling period.

It should be understood that before the maximum transmit power for scheduling the to-be-scheduled terminal devices is calculated, a type of transmit power sharing of the first carrier may be determined based on the third transmit power and the fourth transmit power.

The following uses an example in which the first carrier is the carrier 1 to describe in detail how to determine the type of the transmit power sharing of the carrier.

Figure 6A:
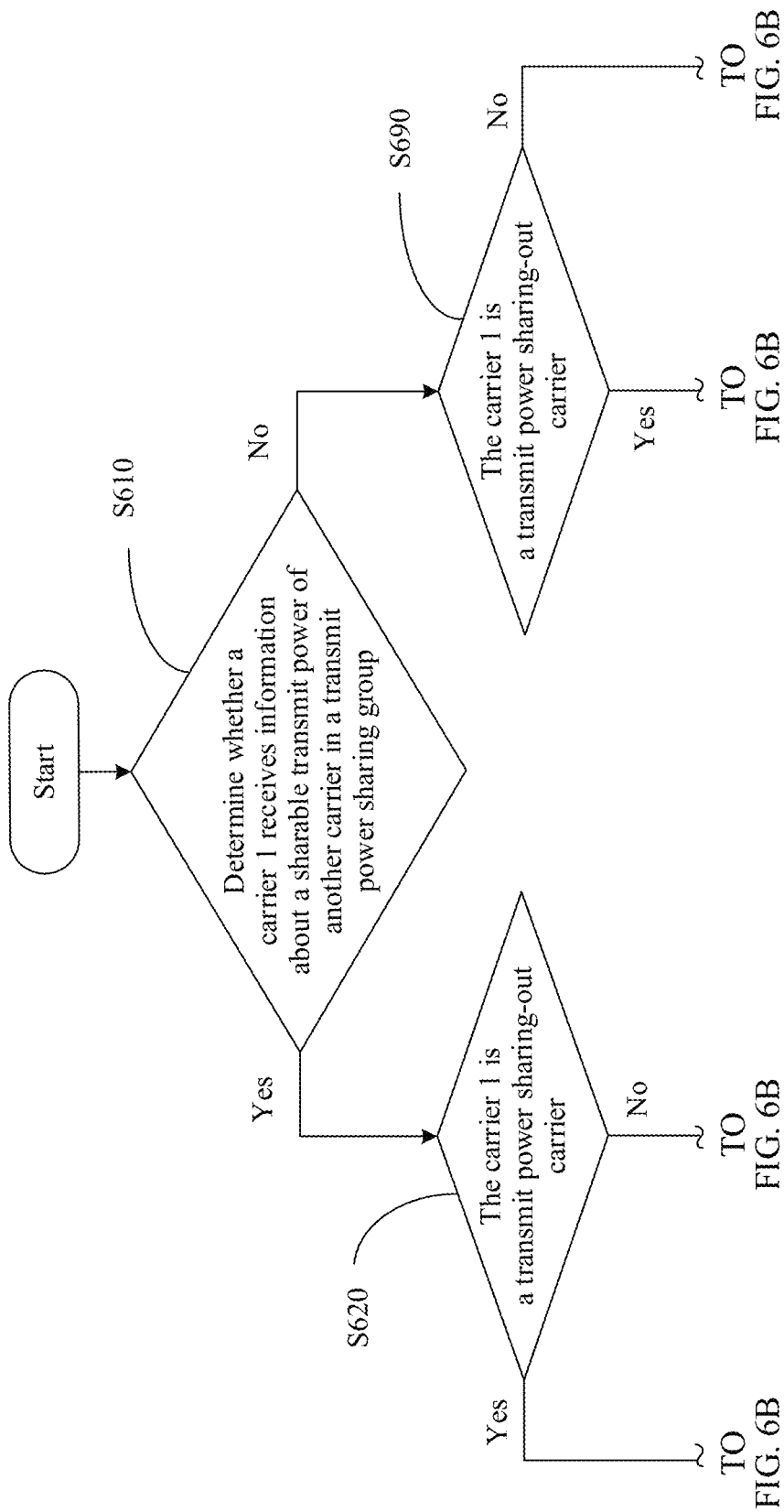
FIG. 6A and FIG. 6B are a flowchart of determining a transmit power sharing type of a carrier.
Figure 6B:
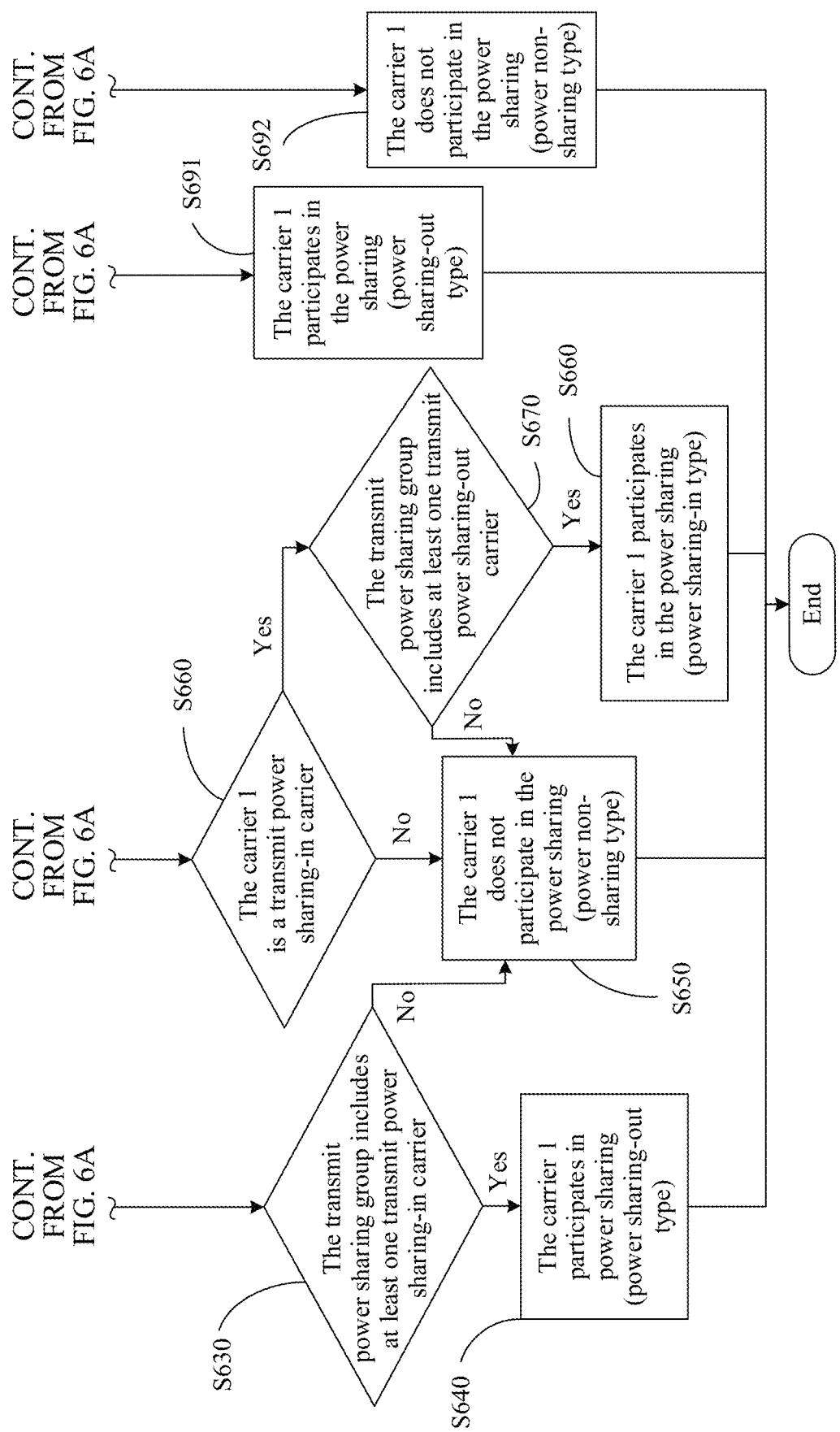

FIG. 6A and FIG. 6B are a flowchart of determining a transmit power sharing type of a carrier. The method includes the following operations: S610 to S692.

S610: Determine whether a carrier 1 receives information about a sharable transmit power of another carrier in a transmit power sharing group. If the carrier 1 receives the information, S620 is performed; otherwise, S690 is performed.

S620: Determine whether the carrier 1 is a transmit power sharing-out carrier.

Whether the carrier 1 is a transmit power sharing-out carrier is determined based on the third transmit power. If the third transmit power is a positive number, S630 is performed; otherwise, S660 is performed.

S630: Determine whether there is at least one transmit power sharing-in carrier in the transmit power sharing group.

Whether there is at least one transmit power sharing-in carrier in the transmit power sharing group is determined based on the received fourth transmit power. If the fourth transmit power is a negative number, S640 is performed; otherwise, S650 is performed.

S640: The carrier 1 participates in transmit power sharing, and a sharing type of the carrier 1 is a transmit power sharing-out type.

S650: The carrier 1 does not participate in the transmit power sharing, and the sharing type of the carrier 1 is a transmit power non-sharing type.

S660: Determine whether the carrier 1 is a transmit power sharing-in carrier.

Whether the carrier 1 is a transmit power sharing-out carrier is determined based on the third transmit power. If the third transmit power is a negative number, S670 is performed; otherwise, S650 is performed.

S670: Determine whether there is at least one transmit power sharing-out carrier in the transmit power sharing group.

Whether there is at least one transmit power sharing-out carrier in the transmit power sharing group is determined based on the received fourth transmit power. If the fourth transmit power is a positive number, S680 is performed; otherwise, S650 is performed.

S680: The carrier 1 participates in the transmit power sharing, and the sharing type of the carrier 1 is a transmit power sharing-in type.

S690: Determine whether the carrier 1 is a transmit power sharing-out carrier.

Whether the carrier 1 is a transmit power sharing-out carrier is determined based on the third transmit power. If the third transmit power is a positive number, S691 is performed; otherwise, S692 is performed.

S691: The carrier 1 participates in the transmit power sharing, and the sharing type of the carrier 1 is the transmit power sharing-out type.

S692: The carrier 1 does not participate in the transmit power sharing, and the sharing type of the carrier 1 is the transmit power non-sharing type.

The actually shared fifth transmit power of the first carrier is determined based on the transmit power sharing type determined by each carrier in the transmit power sharing group.

If the carrier 1 is a transmit power sharing-out carrier, and the carrier 1 does not receive the information about sharable transmit powers of all carriers in the transmit power sharing group, an actually shared transmit power of the carrier 1 is as follows:

$$P_{ShareOut\_Act}^1 = P_{ShareOut\_Est}^1.$$

Otherwise, statistics about a sum of sharable transmit powers of all transmit power sharing-out carriers and statistics about a sum of sharable transmit powers of all transmit power sharing-in carriers are collected:

$$P_{ShareOut\_Sum} = \sum_{i=1}^{Nout} P_{ShareOut\_Est}^i, \text{ and}$$

$$P_{ShareIn\_Sum} = \sum_{i=1}^{Nin} P_{ShareIn\_Est}^i.$$

$N_{out}$ is a quantity of transmit power sharing-out carriers in the transmit power sharing group, $N_{in}$ is a quantity of transmit power sharing-in carriers in the transmit power sharing group, and i is an identifier of each carrier in the transmit power sharing group.

The sum of the sharable transmit powers of the transmit power sharing-out carriers in the transmit power sharing group may be referred to as a sum of sharing-out transmit powers. The sum of the sharable transmit powers of all transmit power sharing-in carriers in the transmit power sharing group may be referred to as a sum of sharing-in transmit powers.

All transmit power sharing-out carriers shares, with all transmit power sharing-in carriers based on a preset rule, the sum of the sharing-out transmit powers.

Optionally, in some embodiments, the preset rule includes: allocating, based on a proportion of the sharing-in transmit powers in the transmit power sharing-in carriers, the sum of the sharing-out transmit powers to the transmit power sharing-in carriers.

If $P_{ShareOut\_Sum} \geq P_{ShareIn\_Sum}$, for a transmit power sharing-out carrier i, an actually shared-out transmit power is:

$$P_{ShareOut\_Act}^i = \text{ceil}\left(\frac{P_{Sharein\_Sum}}{P_{Shareout\_Sum}} \times P_{Shareout\_Est}^i\right),$$

and for a transmit power sharing-in carrier i, an actually shared-in transmit power is:

$$P_{ShareIn\_Act}^i = P_{ShareIn\_Est}^i.$$

If $P_{ShareOut\_Sum} < P_{ShareIn\_Sum}$, for the transmit power sharing-out carrier i, an actually shared-out transmit power is:

$$P_{ShareOut\_Act}^i = P_{ShareOut\_Est}^i, \text{ and}$$

for the transmit power sharing-in carrier i, an actually shared-in transmit power is:

$$P_{Sharein\_Act}^i = \text{floor}\left(\frac{P_{Shareout\_Sum}}{P_{Sharein\_Sum}} \times P_{Shareout\_Est}^i\right).$$

Optionally, in some other embodiments, the preset rule includes: preferentially allocating the sum of the sharing-out transmit powers to the transmit power sharing-in carrier with a high priority, and allocating a sum of the remaining sharing-out transmit powers to the transmit power sharing-in carrier with a low priority. If $P_{ShareOut\_Sum} \geq P_{ShareIn\_Sum}$, for the transmit power sharing-out carrier i, an actually shared-out transmit power is:

$$P_{ShareOut\_Act}^i = \text{ceil}\left(\frac{P_{Sharein\_Sum}}{P_{Shareout\_Sum}} \times P_{Shareout\_Est}^i\right),$$

and for the transmit power sharing-in carrier i, an actually shared-in transmit power is:

$$P_{ShareIn\_Act}^i = P_{ShareIn\_Est}^i.$$

If $P_{ShareOut\_Sum} < P_{ShareIn\_Sum}$, for the transmit power sharing-out carrier i, an actually shared-out transmit power is:

$$P_{ShareOut\_Act}^i = P_{ShareOut\_Est}^i.$$

A sequence $\{1, 2, \ldots, N_{in}\}$ of the transmit power sharing-in carriers is sorted based on a carrier priority to obtain a sorted sequence $\{q_1, q_2, \ldots, q_{N_{in}}\}$, and a minimum integer Q that makes the following formula true is searched for:

$$\Sigma_{i=1}^{Q} P_{ShareIn\_Est}^{q_i} = P_{ShareOut\_Sum}, \text{ and}$$

for the transmit power sharing-in carrier i, an actually shared-in transmit power is:

$$P_{Sharein\_Act}^{q_i} = \begin{cases} P_{Sharein\_Est}^{q_i} & i = 1, 2, \cdots, Q-1 \\ P_{ShareOut\_Sum} & i = Q \\ 0 & i = Q+1, Q+2, \cdots, N \end{cases}.$$

It should be understood that both the actually shared-out transmit power and the actually shared-in transmit power may be referred to as a fifth transmit power.

When the fifth transmit power of the first carrier is a positive number, the fifth transmit power of the first carrier is the actually shared-out transmit power.

When the fifth transmit power of the first carrier is a negative number, the fifth transmit power of the first carrier is the actually shared-in transmit power.

The maximum transmit power of the first carrier in the first scheduling period may be determined based on the fifth transmit power and the initially configured transmit power.

Each carrier in the transmit power sharing group determines a maximum transmit power in a next scheduling period, where a maximum transmit power of the transmit power sharing-out carrier is a difference between the initially configured transmit power of a carrier and an actually shared-out transmit power of the transmit power sharing-out carrier, that is, $$P_{max}^i = P_{CFG}^i - P_{SharareOut\_Act}^i.$$

A maximum transmit power of the transmit power sharing-in carrier is a sum of the initially configured transmit power of the carrier and an actually shared-in transmit power of the transmit power sharing-in carrier, that is, $$P_{max}^i = P_{CFG}^i + P_{ShareIn\_Act}^i.$$

A maximum transmit power of the transmit power non-sharing carrier is the initially configured transmit power of the carrier, that is, $$P_{max}^i = P_{CFG}^i.$$

Optionally, in some embodiments, the information about the third transmit power is broadcast to the transmit power sharing group in a first preset time duration.

That the receiving the information about the sharable fourth transmit power of another carrier, other than the first carrier, in the transmit power sharing group includes:

receiving, in a second preset time duration, the information about the sharable fourth transmit power of the another carrier, other than the first carrier, in the transmit power sharing group, where an end moment of the first preset time duration is earlier than or equal to an end moment of the second preset time duration.

Figure 7:
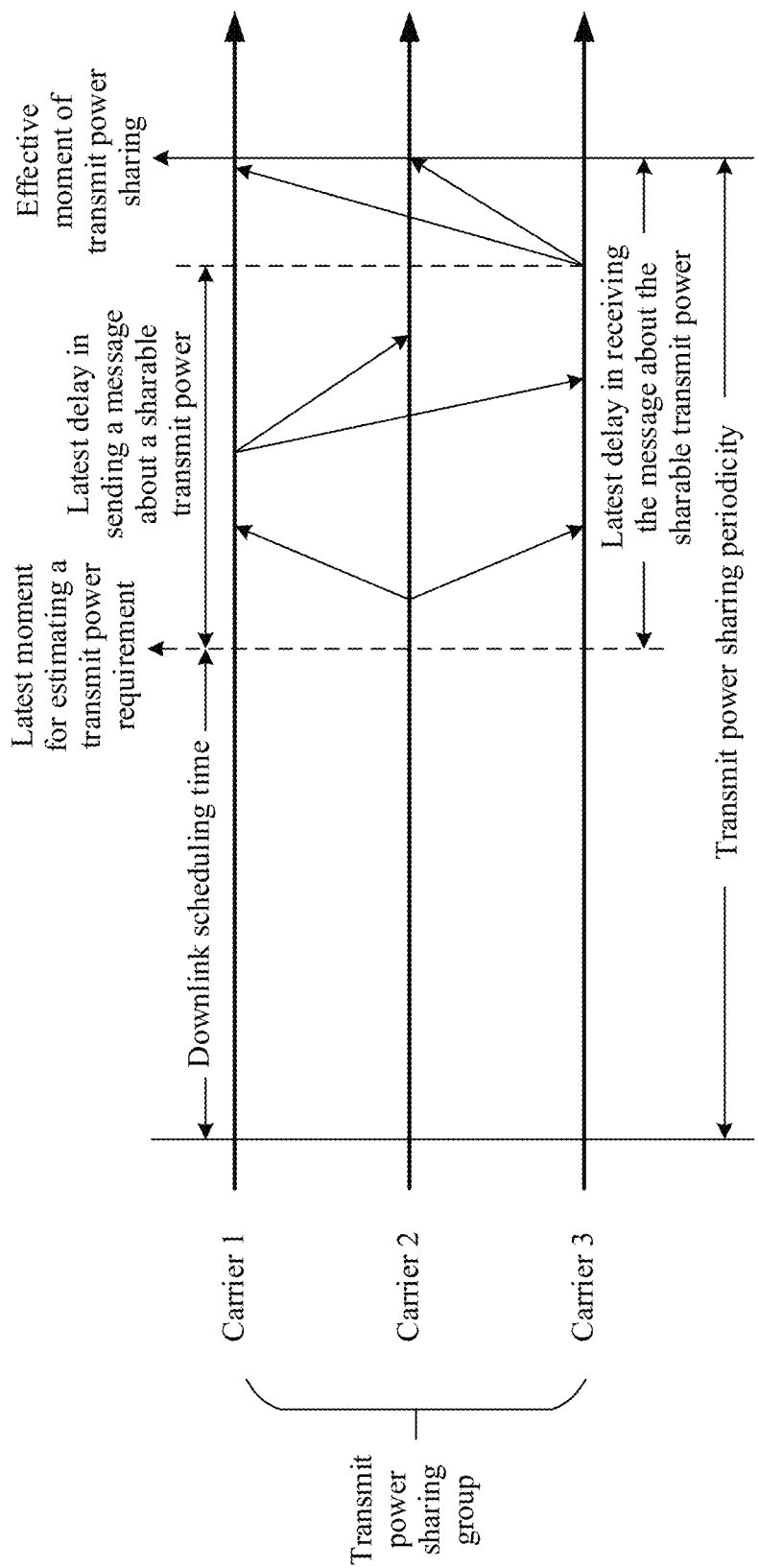
FIG. 7 is a schematic diagram of exchanging information about sharable transmit powers according to an embodiment of this application.

FIG. 7 is a schematic diagram of exchanging information about sharable transmit powers according to an embodiment of this application. As shown in FIG. 7, after downlink scheduling is performed, each carrier in the transmit power sharing group sends, to another carrier before a latest sending delay, the estimated information about the sharable transmit power, and each carrier receives, before a latest receiving delay, information that is sent by another carrier and that is about the sharable transmit power.

The latest sending delay shown in FIG. 7 is the foregoing first preset time duration, and the latest receiving delay is the foregoing second preset time duration.

Optionally, in some embodiments, before the first transmit power required in the first carrier in the first scheduling period is calculated, that the first carrier meets a preset condition is determined, and a transmit power sharing group including the first carrier and at least one second carrier is established.

Optionally, the foregoing preset condition includes: supporting, by the first carrier, carrier transmit power sharing, and sharing, by the first carrier and the at least one second carrier, one transmit power amplifier.

That the first carrier supports carrier transmit power sharing may be understood as that the first carrier enables an inter-carrier transmit power sharing function.

The following describes the process of establishing the transmit power sharing group by using the establishment of a transmit power sharing group including the carrier 1, a carrier 2, and a carrier 3 as an example.

The carrier 1, the carrier 2, and the carrier 3 share one transmit power amplifier, and the carrier 1 is a carrier that enables the inter-carrier transmit power sharing function. One transmit power sharing group is established to include the carrier 1, the carrier 2, and the carrier 3.

Figure 8:
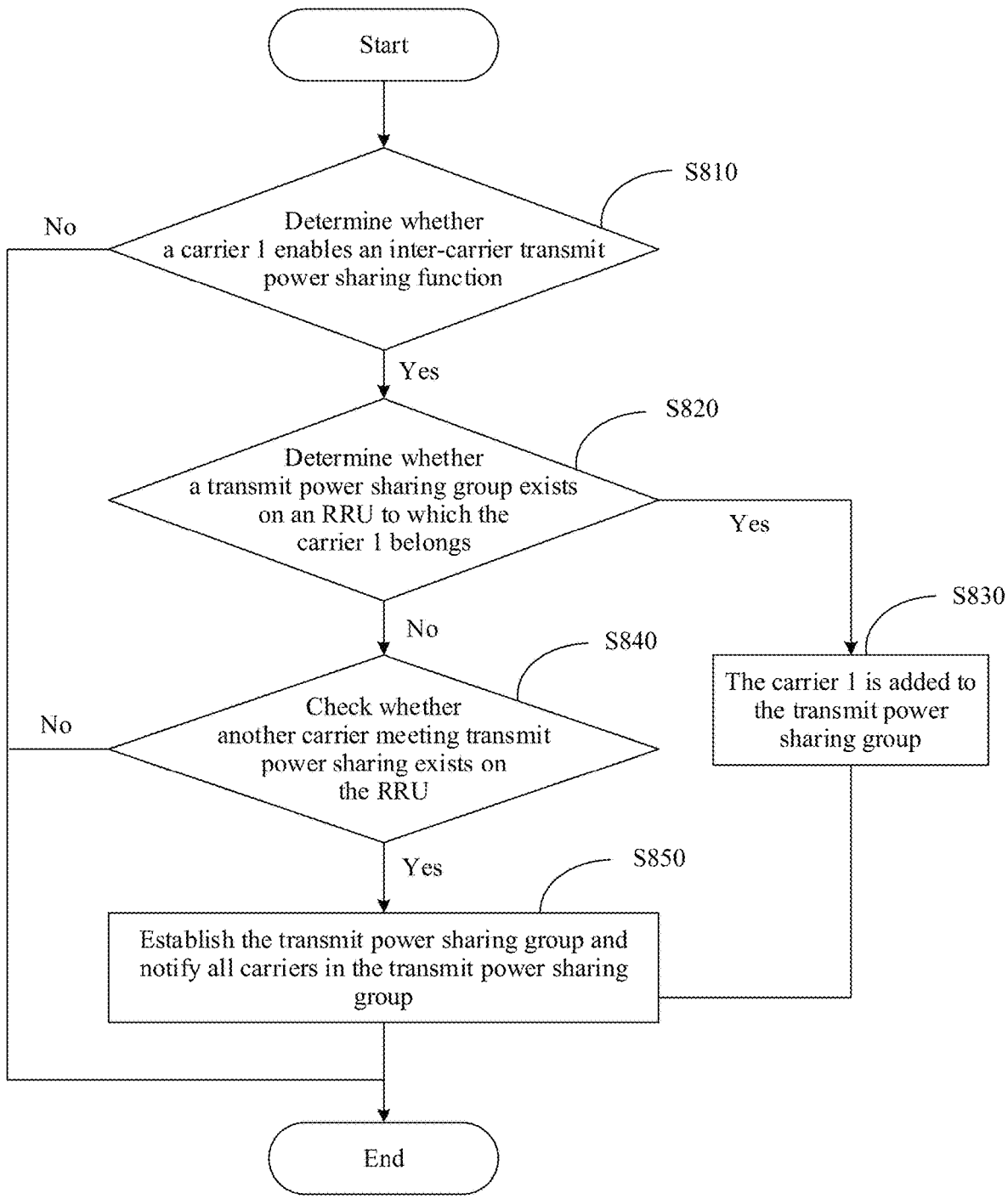
FIG. 8 is a schematic flowchart of establishing a transmit power sharing group.

FIG. 8 is a schematic flowchart of establishing a transmit power sharing group. The method includes five operations: S810 to S850.

S810: Determine whether a carrier 1 enables an inter-carrier transmit power sharing function. If the carrier 1 does not enable the inter-carrier transmit power sharing function, the procedure of establishing the transmit power sharing group ends directly. If the carrier 1 enables the inter-carrier transmit power sharing function, S720 is performed.

S820: Determine whether a transmit power sharing group exists on a remote radio unit (RRU) to which the carrier 1 belongs. The RRU to which the carrier 1 belongs may be understood as a transmit power amplifier to which the carrier 1 belongs.

For example, if the carrier 1 belongs to an RRU 1, and a carrier 2 and a carrier 3 included in the RRU 1 already form a transmit power sharing group 1, S730 is performed. When no transmit power sharing group exists on the RRU to which the carrier 1 belongs, S540 is performed.

S830: A network device adds the carrier 1 to the transmit power sharing group exists on the RRU to which the carrier 1 belongs. For example, the carrier 1 is added to the transmit power sharing group 1.

S840: The network device detects whether at least one other carrier meeting the transmit power sharing between carriers exists on the RRU to which the carrier 1 belongs.

For example, the network device detects whether the carrier 2 exists on the RRU 1 to which the carrier 1 belongs. The carrier 2 enables the inter-carrier transmit power sharing function and shares one transmit power amplifier with the carrier 1. If another carrier meeting the transmit power sharing between carriers exists on the RRU to which carrier 1 belongs, S550 is performed. If another carrier meeting the transmit power sharing between carriers does not exist on the RRU to which the carrier 1 belongs, the procedure of establishing the transmit power sharing group ends directly.

S850: The network device establishes the transmit power sharing group existing on the RRU to which the carrier 1 belongs, and notifies each carrier included in the transmit power sharing group.

Optionally, in some embodiments, when the first scheduling period is the initial scheduling period, the terminal devices are scheduled based on an initially configured transmit power.

The network device configures a maximum transmit power in the scheduling period for each carrier in the transmit power sharing group.

Optionally, if the carrier 1 is added to the transmit power sharing group for the first time, the initial transmit power ($P_{CFG}^1$) configured by the network device for the carrier 1 is used as a maximum transmit power of the carrier 1, that is, $P_{max}^1 = P_{CFG}^1$.

Optionally, if the carrier 1 is not added to the transmit power sharing group for the first time, the maximum transmit power determined in the first scheduling period is used as a maximum transmit power in the first scheduling period.

It should be understood that, a sum of maximum transmit powers of carriers in the transmit power sharing group is not greater than a rated total transmit power ($P_{max}$) of the transmit power amplifier shared by the carriers, that is, $\Sigma_{i=1}^m p_{max}^m \leq P_{max}$, where m≥2, and m is used to represent a quantity of carriers included in the transmit power sharing group.

Optionally, in some embodiments, the to-be-scheduled terminal devices are scheduled based on the maximum transmit power in the first scheduling period.

It should be understood that, each carrier in the transmit power sharing group separately schedules the terminal devices based on the maximum transmit power.

Optionally, if the carrier 1 is a transmit power sharing-out carrier, the maximum transmit power configured by the network device for the carrier 1 in the first scheduling period is less than the initial transmit power configured by the network device for the carrier 1. Further, when the carrier 1 performs user equipment scheduling in the first scheduling period, a quantity of scheduled resource blocks (RB) is limited based on the maximum transmit power configured by the network device for the carrier 1 in the scheduling period.

Optionally, if the carrier 1 is a transmit power sharing-in carrier, or the carrier 1 is a transmit power non-sharing carrier, the maximum transmit power configured by the network device for the carrier 1 in the first scheduling period is greater than or equal to the initial transmit power configured by the network device for the carrier 1. Further, when performing user equipment scheduling in the first scheduling period, the carrier 1 performs scheduling based on the initial transmit power configured by the network device for the carrier 1.

Optionally, in some embodiments, after the to-be-scheduled terminal devices are scheduled based on the maximum transmit power, when the first carrier has a remaining seventh transmit power, the method further includes:

collecting statistics about a scheduled terminal device that is in the scheduled terminal devices and whose transmit power can be boosted; and using the remaining transmit power for the scheduled terminal devices whose transmit power can be boosted.

The following uses the carrier 1 as an example to describe transmit power boosting.

If a remaining seventh transmit power exists after the carrier 1 completes scheduling the terminal devices in the first scheduling period, the carrier 1 collects statistics about the scheduled terminal devices that are in the scheduled terminal devices loaded by the carrier 1 and whose transmit power can be boosted, and uses the remaining transmit power for the scheduled terminal devices whose transmit power can be boosted, to perform transmit power boosting.

For example, if a remaining transmit power ($P_{Remain}^1$) exists after the carrier 1 completes scheduling the terminal devices in the first scheduling period. In other words, after the carrier 1 completes scheduling the terminal devices in the first scheduling period, the transmit power actually used by the carrier 1 is less than the maximum transmit power configured by the network device for the carrier 1 in the first scheduling period. In this case, the carrier 1 collects statistics about a quantity of RBs ($N_{RB\_Lift}^1$) occupied by the scheduled terminal devices that are in the scheduled terminal devices loaded by the carrier 1 and whose transmit power can be boosted, and calculates a transmit power that can be boosted on each RB:

$$P_{RB\_Lift}^1(dB) = 10\log\left(\frac{\frac{P_{Remain}^1}{N_{RB\_Lift}^1} + \frac{P_{CFG}^1}{N_{RB}^1}}{\frac{P_{CFG}^1}{N_{RB}^1}}\right),$$

where $N_{RB}^1$ is a total quantity of RBs occupied by the carrier 1. Based on a maximum transmit power boosting amplitude $P_{user\_Max\_Lift}^1$ corresponding to different scheduling manners and different modulation schemes of the terminal devices, the boosted transmit power of the scheduled terminal devices whose transmit power can be boosted is determined to be:

$$P_{User\_Lift}^1(dB) = \text{Min}\{P_{RB\_Lift}^1, P_{User\_Max\_Lift}^1\}.$$

Optionally, if a scheduling manner of the scheduled terminal devices whose transmit power can be boosted is retransmission scheduling, or a scheduling manner of the scheduled terminal devices whose transmit power can be boosted is initial transmission scheduling, and the terminal devices have no more data to be transmitted, only the transmit power of the terminal devices need to be updated, that is, $$P_{User\_Sch}^1(dB) = P_{User\_Sch}^1(dB) + P_{User\_Lift}^1(dB).$$

Optionally, if the scheduling manner of the scheduled terminal device whose transmit power can be boosted is initial transmission scheduling and the terminal device has no more data to be transmitted, the transmit power of the terminal device, a modulation and coding scheme (MCS) and a TBS of the terminal device need to be updated, that is, $$P_{User\_Sch}^1(dB) = P_{User\_Sch}^1(dB) + P_{User\_Lift}^1(dB),$$

$$MCS_{User\_Sch}^1 = MCS_{User\_Sch}^1 + MCS_{User\_Lift}^1, \text{ and}$$

$$TBS_{User\_Sch}^1 = TBS_{User\_Sch}^1 + TBS_{User\_Lift}^1.$$

$MCV_{User\_Lift}$ is obtained by searching a table of a correspondence between an MCS and a signal-to-noise ratio (SNR), and $TBS_{User\_Lift}$ is obtained by searching a table of a correspondence between a TBS and an MCS.

The foregoing describes in detail the power sharing method provided in the embodiments of this application with reference to FIG. 4 to FIG. 8. The following describes in detail a power sharing apparatus in the embodiments of this application with reference to FIG. 9 and FIG. 10.

Figure 9:
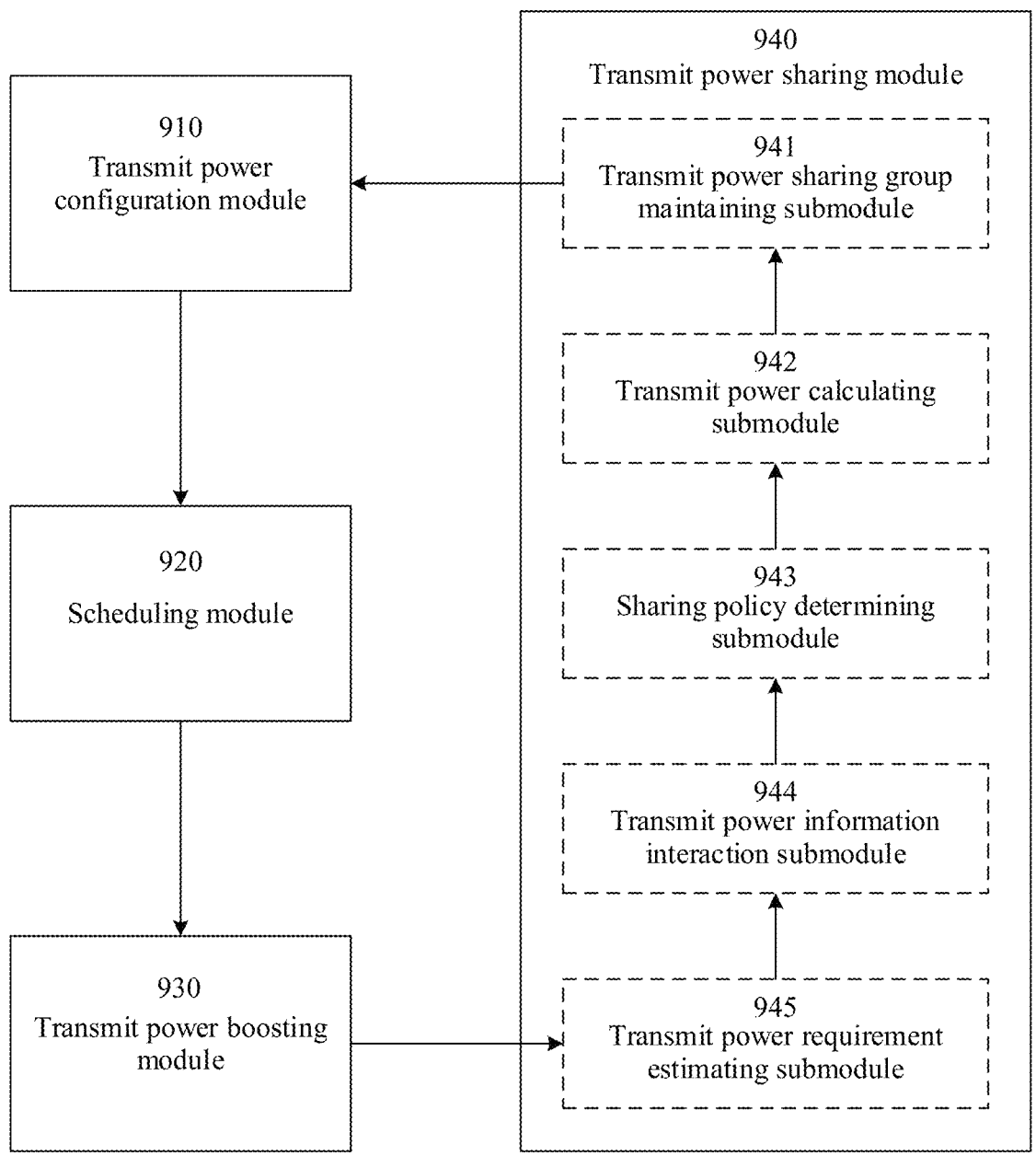
FIG. 9 is a schematic diagram of a power sharing apparatus according to an embodiment of this application.

FIG. 9 is a schematic diagram of a power sharing apparatus according to an embodiment of this application. The apparatus includes:

a transmit power configuration module 910, connected to a transmit power sharing module, and configured to: configure a maximum transmit power for each carrier based on maximum transmit powers of carriers determined by the transmit power sharing module, where a sum of the maximum transmit powers of the carriers is not greater than a rated total transmit power of a power amplifier;

a scheduling module 920, connected to the transmit power configuration module, and configured to schedule a user equipment in a scheduling period based on the maximum transmit power of the carrier configured by the transmit power configuration module;

a transmit power boosting module 930, connected to the scheduling module, and configured to perform, based on an actual remaining transmit power of the carrier obtained by the scheduling module, transmit power boosting on a scheduled user equipment whose transmit power can be boosted; and a transmit power sharing module 940, configured to flexibly allocate the transmit power based on a transmit power requirement of the carrier.

Optionally, the transmit power sharing module 940 includes:

a transmit power sharing group maintaining submodule 941, configured to: establish a transmit power sharing group including a plurality of carriers that share a transmit power amplifier and that enable an inter-carrier transmit power sharing function, and update carrier information in the transmit power sharing group in real time;

a transmit power calculating submodule 942, connected to a sharing policy determining submodule, and configured to: calculate an actually shared transmit power of the carrier based on a transmit power sharing type obtained by transmit power sharing type determining submodule, and determine a maximum transmit power in a next scheduling period;

a sharing policy determining submodule 943, connected to a transmit power information interaction submodule, and configured to determine a transmit power sharing type in a next scheduling period based on the information that is obtained by the transmit power interaction submodule and that is about the sharable transmit power of each carrier in the transmit power sharing group;

a transmit power information interaction submodule 944, connected to a transmit power requirement estimating submodule, and configured to send and receive, in a broadcast manner among the carriers in the transmit power sharing group, the information that is obtained by the transmit power estimating submodule and that is about the sharable transmit power; and a transmit power requirement estimating submodule 945, connected to the transmit power boosting module, and configured to: estimate transmit power requirement information of each carrier in the transmit power sharing group in the next scheduling period after scheduling, and calculate the information about the sharable transmit power.

Figure 10:
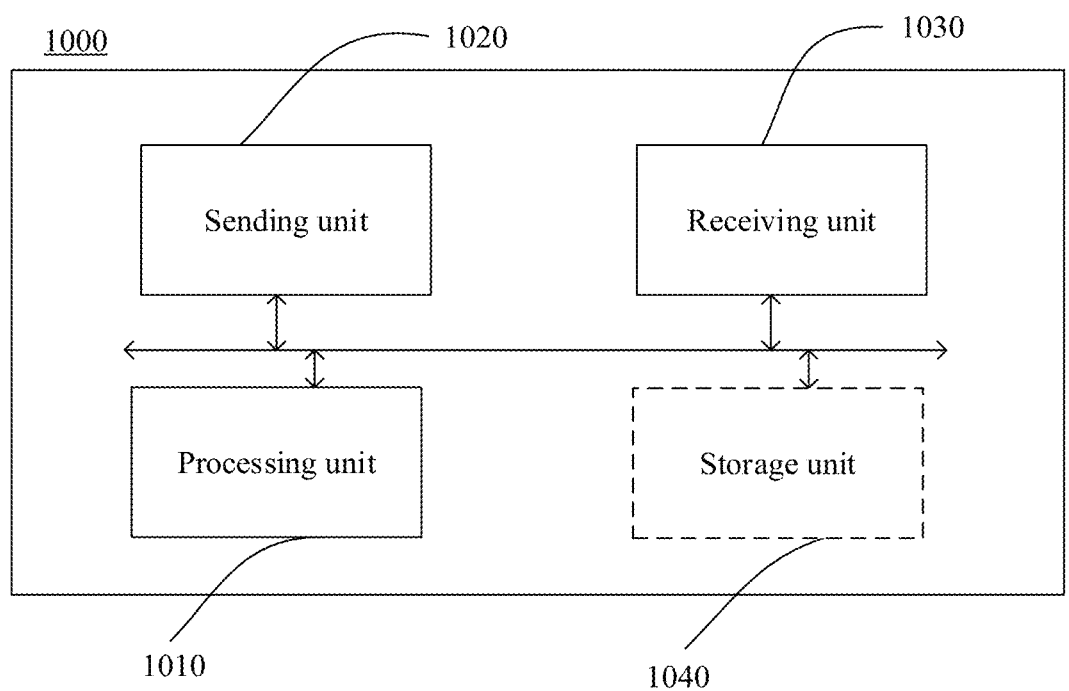
FIG. 10 is a schematic diagram of another power sharing apparatus according to an embodiment of this application.

FIG. 10 is a schematic diagram of another power sharing apparatus according to an embodiment of this application. The apparatus includes:

FIG. 10 is a schematic structural diagram of a power sharing apparatus 1000. The apparatus 1000 may be configured to implement the methods described in the foregoing method embodiments. For details, refer to the description in the foregoing method embodiments. The power sharing apparatus 1000 may be a chip.

The power sharing apparatus 1000 includes one or more processing units 1010. The processing unit 1010 may be a general purpose processor, a dedicated processor, or the like. For example, the processing unit 1010 may be a baseband processor or a central processing unit. The baseband processor may be configured to process a communication protocol and communication data. The central processing unit may be configured to: control the power sharing apparatus (such as a base station, a terminal, or a chip), execute a software program, and process data of the software program.

The power sharing apparatus may include a sending unit 1020, configured to output (send) a signal. For example, the power sharing apparatus may be the chip, and the sending unit 1020 may be an output circuit or a communications interface of the chip.

The power sharing apparatus may include a receiving unit 1030, configured to input (receive) a signal. For example, the power sharing apparatus may be the chip, and the sending unit 1020 may be an input circuit or a communications interface of the chip.

The power sharing apparatus 1000 includes one or more processing units 1010, and the one or more processing units 1010 may implement operations performed in the power sharing method in the embodiments shown in FIG. 4 to FIG. 8. The power sharing apparatus 1000 includes:

a processing unit, configured to estimate a first transmit power based on a traffic volume of terminal devices to be scheduled in a first carrier in a first scheduling period, where the first transmit power is a transmit power required in the first carrier to schedule the to-be-scheduled terminal devices in the first scheduling period. In this case, the processing unit may be understood as the transmit power requirement estimating submodule 945 shown in FIG. 9.

The processing unit is further configured to estimate a second transmit power based on the first transmit power and an initially configured transmit power, where the second transmit power is a remaining transmit power of the first carrier in the first scheduling period. In this case, the processing unit may be understood as the transmit power requirement estimating submodule 945 shown in FIG. 9.

The processing unit is further configured to calculate a third transmit power based on the second transmit power and a preset shared transmit power, where the third transmit power is a sharable transmit power of the first carrier in the first scheduling period. In this case, the processing unit may be understood as the transmit power requirement estimating submodule 945 shown in FIG. 9.

The power sharing apparatus 1000 further includes: a sending unit, configured to broadcast information about the third transmit power to a transmit power sharing group, where the first carrier is any carrier in the transmit power sharing group, and the transmit power sharing group includes a plurality of carriers. In this case, the sending unit may be understood as the transmit power information interaction submodule 944 shown in FIG. 9.

It should be understood that the transmit power information interaction submodule 944 may directly perform information interaction on the remaining transmit power percentage information of each carrier based on the method of dynamic transmit power sharing between carriers shown in FIG. 2 and FIG. 3. In other words, the information exchange performed by the transmit power information interaction submodule in this embodiment of this application is not necessarily only for the information about the third transmit power and information about a fourth transmit power.

The power sharing apparatus 1000 further includes: a receiving unit, configured to receive the information about the fourth transmit power, where the fourth transmit power is a sharable transmit power of another carrier, other than the first carrier, in the transmit power sharing group. In this case, the receiving unit may be understood as the transmit power information interaction submodule 944 shown in FIG. 9.

The processing unit is further configured to calculate a fifth transmit power based on the information about the third transmit power and the information about the fourth transmit power, where the fifth transmit power is an actually shared transmit power of the first carrier in the first scheduling period. In this case, the processing unit may be understood as the transmit power configuration module 910, the transmit power sharing group maintaining submodule 941, and the sharing policy determining submodule 943 shown in FIG. 9.

The processing unit is further configured to: calculate a sixth transmit power based on the fifth transmit power and the initially configured transmit power, where the sixth transmit power is a maximum transmit power in the first carrier to schedule the to-be-scheduled terminal devices in the first scheduling period. In this case, the processing unit may be understood as the transmit power calculating submodule 942 shown in FIG. 9.

That the processing unit is configured to estimate a first transmit power based on a traffic volume of terminal devices to be scheduled in a first carrier in a first scheduling period includes: after completing scheduling the terminal devices in a second scheduling period, estimating, by the processing unit, the first transmit power based on the traffic volume of the terminal devices to be scheduled in the first carrier in the first scheduling period, where the first scheduling period is a next scheduling period of the second scheduling period.

In an embodiment, that the sending unit broadcasts the information about the third transmit power to the transmit power sharing group includes: broadcasting, by the sending unit, the information about the third transmit power to the transmit power sharing group in a first preset time duration; and that the receiving unit receives the information about the fourth transmit power includes: receiving, by the receiving unit, the information about the fourth transmit power in a second preset time duration, where an end moment of the first preset time duration is earlier than or equal to an end moment of the second preset time duration.

The processing unit is further configured to schedule the to-be-scheduled terminal devices based on the sixth transmit power in the first scheduling period. In this case, the processing unit may be understood as the scheduling module 920 shown in FIG. 9.

In an embodiment, before the first transmit power required in the first carrier in the second scheduling period is calculated, the processing unit is further configured to: determine that the first carrier meets a preset condition, and establish the transmit power sharing group including the first carrier and at least one second carrier. In this case, the processing unit may be understood as the transmit power sharing module 940 shown in FIG. 9.

In an embodiment, the first carrier supports carrier transmit power sharing, and the first carrier and the at least one second carrier share one transmit power amplifier.

After the processing unit schedules the to-be-scheduled terminal devices based on the sixth transmit power, when the first carrier has a remaining seventh transmit power, the processing unit is further configured to collect statistics about a scheduled terminal device that is in the scheduled terminal devices and whose transmit power can be boosted, and the processing unit is further configured to use the seventh transmit power for the scheduled terminal devices whose transmit power can be boosted. In this case, the processing unit may be understood as the transmit power boosting module 930 shown in FIG. 9.

In an embodiment, the traffic volume of the to-be-scheduled terminal devices includes a to-be-scheduled signalling radio bearer and/or a to-be-scheduled data radio bearer.

In an embodiment, the first transmit power includes: an eighth transmit power required in the first carrier to schedule the to-be-scheduled terminal devices, and a ninth transmit power required in the first carrier to schedule the terminal devices that are in the to-be-scheduled terminal devices and whose transmit power can be boosted.

In an embodiment, when the second scheduling period is the initial scheduling period, that the scheduling unit completes scheduling the terminal devices in a second scheduling period includes that the processing unit is configured to schedule the terminal devices based on the initially configured transmit power.

The power sharing apparatus further includes:

a storage unit 1040, configured to store a corresponding instruction; and a processing unit, configured to execute an instruction in the storage unit to implement operations in the foregoing method embodiments.

Still another aspect of this application provides a computer-readable storage medium. The computer-readable storage medium stores an instruction; and when the instruction is run on a computer, the computer is enabled to perform the operations in the method shown in FIG. 4 to FIG. 8.

Still another aspect of this application provides a computer program product including an instruction. When the computer program product is run on a computer, the computer is enabled to perform operations in the method shown in FIG. 4 to FIG. 8.

It should be noted that the foregoing method embodiments may be applied to a processor or may be implemented by a processor. The processor may be an integrated circuit chip and has a signal processing capability. In an implementation process, operations in the foregoing method embodiments may be implemented by using a hardware integrated logic circuit in the processor, or by using an instruction in a form of software. The processor may be a general purpose processor, a digital signal processor (DSP), an application-specific integrated circuit (ASIC), a field programmable gate array (FPGA) or another programmable logic device, a discrete gate or transistor logic device, or a discrete hardware component. The methods, the operations, and logic block diagrams that are disclosed in the embodiments of this application may be implemented or performed. The general purpose processor may be a microprocessor, or the processor may be any conventional processor or the like. The operations of the methods disclosed with reference to the embodiments of this application may be directly executed and accomplished by using a hardware decoding processor, or may be executed and accomplished by using a combination of hardware and software modules in a decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the operations in the foregoing methods in combination with hardware of the processor.

It may be understood that, in the embodiments of this application, the memory may be a volatile memory or a nonvolatile memory, or may include both a volatile memory and a non-volatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct memory bus random access memory (DR RAM). It should be noted that memories in the system and method described in this specification include but are not limited to the memories and memories of any other proper types.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

A person of ordinary skill in the art may be aware that units and algorithm operations in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions of each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electronic form, a mechanical form, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

When the functions are implemented in the form of a software function unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the operations of the methods described in the embodiments of this application. The storage medium includes any medium that can store program code such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A power sharing method, comprising:
    estimating, by a network device, a first transmit power based on a traffic volume of to-be-scheduled terminal devices in a first carrier in a first scheduling period, wherein the first transmit power is a transmit power in the first carrier for scheduling the to-be-scheduled terminal devices in the first scheduling period;
    estimating, by the network device, a second transmit power based on the first transmit power and an initially configured transmit power of the first carrier, wherein the second transmit power is a remaining transmit power of the first carrier in the first scheduling period;
    calculating, by the network device, a third transmit power based on the second transmit power and a preset shared transmit power, wherein the third transmit power is a sharable transmit power of the first carrier in the first scheduling period;
    broadcasting, by the network device, information about the third transmit power to the transmit power sharing group;
    receiving, by the network device, information about a fourth transmit power, wherein the fourth transmit power is a sharable transmit power of a second carrier in the transmit power sharing group; and
    calculating, by the network device, a fifth transmit power based on the information about the third transmit power and the information about the fourth transmit power, wherein the fifth transmit power is an actually shared transmit power of the first carrier in the first scheduling period.

2. The method according to claim 1, wherein the method further comprises:
    exchanging, by the network device, the sharable transmit power of the first carrier and the sharable transmit power of the second carrier in the transmit power sharing group in a broadcast manner to perform transmit power sharing.

3. The method according to claim 1, wherein the transmit power sharing group comprises a plurality of carriers, and wherein the first carrier and the second carriers are any two carriers of the plurality of carriers in a transit power sharing group.

4. The method according to claim 1, wherein the method further comprises:
    calculating, by the network device, a sixth transmit power based on the fifth transmit power and the initially configured transmit power, wherein the sixth transmit power is a maximum transmit power in the first carrier to schedule the to-be-scheduled terminal devices in the first scheduling period; and
    scheduling, by the network device, the to-be-scheduled terminal devices based on the sixth transmit power in the first scheduling period.

5. The method according to claim 4, the method further comprises:
    determining, by the network device, that the first carrier has a remaining transit power after scheduling the to-be-scheduled terminal devices;
    collecting, by the network device, statistics about a scheduled terminal device of the scheduled terminal devices;
    determining, by the network device based on the statistics, that a transmit power of the scheduled terminal device can be boosted; and
    boosting, by the network device, the transmit power of the scheduled terminal device using the remaining transit power in the first carrier.

6. The method according to claim 1, wherein the broadcasting of the information about the third transmit power to the transmit power sharing group comprises:
    broadcasting, by the network device, the information about the third transmit power to the transmit power sharing group in a first preset time duration; and
    wherein the receiving of the information about the fourth transmit power comprises:
    receiving, by the network device, the information about the fourth transmit power in a second preset time duration, wherein an end moment of the first preset time duration is earlier than or equal to an end moment of the second preset time duration.

7. The method according to claim 1, wherein the estimating of the first transmit power based on the traffic volume of the to-be-scheduled terminal devices in the first carrier in the first scheduling period comprises:
    after completing scheduling the terminal devices in a second scheduling period, estimating, by the network device, the first transmit power based on the traffic volume of the to-be-scheduled terminal devices in the first carrier in the first scheduling period, wherein the first scheduling period is a next scheduling period after the second scheduling period.

8. The method according to claim 7, wherein when the second scheduling period is the first scheduling period, the completing of the scheduling of the terminal devices in the second scheduling period comprises:
    scheduling, by the network device, the terminal devices based on the initially configured transmit power of the first carrier.

9. The method according to claim 1, wherein the first transmit power comprises:
    an eighth transmit power required in the first carrier to schedule the to-be-scheduled terminal devices, and a ninth transmit power required in the first carrier to schedule the terminal devices that are in the to-be-scheduled terminal devices and whose transmit power can be boosted.

10. A power sharing apparatus, comprising:
a processor; and
a memory coupled to the processor and storing programming instructions, which, when executed by the processor, cause the processor to:
estimate a first transmit power based on a traffic volume of to-be-scheduled terminal devices in a first carrier in a first scheduling period, wherein the first transmit power is a transmit power in the first carrier for scheduling the to-be- scheduled terminal devices in the first scheduling period;
estimate a second transmit power based on the first transmit power and an initially configured transmit power of the first carrier, wherein the second transmit power is a remaining transmit power of the first carrier in the first scheduling period;
calculate a third transmit power based on the second transmit power and a preset shared transmit power, wherein the third transmit power is a sharable transmit power of the first carrier in the first scheduling period;
broadcast information about the third transmit power to the transmit power sharing group;
receive information about a fourth transmit power, wherein the fourth transmit power is a sharable transmit power of a second carrier in the transmit power sharing group; and
calculate a fifth transmit power based on the information about the third transmit power and the information about the fourth transmit power, wherein the fifth transmit power is an actually shared transmit power of the first carrier in the first scheduling period.

11. The apparatus according to claim 10, wherein the programming instructions further cause the processor to:
send, in a broadcast manner in a transmit power sharing group in which the first carrier is located, the sharable transmit power of the first carrier, to perform transmit power sharing.

12. The apparatus according to claim 10, wherein the transmit power sharing group comprises a plurality of carriers, and wherein the first carrier and the second carriers are any two carriers of the plurality of carriers in a transit power sharing group.

13. The apparatus according to claim 10, wherein the programming instructions further cause the processor to:
calculate a sixth transmit power based on the fifth transmit power and the initially configured transmit power, wherein the sixth transmit power is a maximum transmit power in the first carrier to schedule the to-be-scheduled terminal devices in the first scheduling period; and
schedule the to-be-scheduled terminal devices based on the sixth transmit power in the first scheduling period.

14. The apparatus according to claim 13, wherein the programming instructions further cause the processor to:
determine that the first carrier has a remaining transit power after scheduling the to-be-scheduled terminal devices;
collect statistics about a scheduled terminal device of the scheduled terminal devices;
determining that a transmit power of the scheduled terminal device can be boosted; and
boost the transmit power of the scheduled terminal device using the remaining transmit power in the first carrier.

15. The apparatus according to claim 10, wherein the programming instructions cause the processor to:
broadcast the information about the third transmit power to the transmit power sharing group in a first preset time duration; and
receive the information about the fourth transmit power in a second preset time duration, wherein an end moment of the first preset time duration is earlier than or equal to an end moment of the second preset time duration.

16. The apparatus according to claim 10, wherein the programming instructions cause the processor to:
complete scheduling the terminal devices in a second scheduling period; and
estimate the first transmit power based on the traffic volume of the to-be-scheduled terminal devices in the first carrier in the first scheduling period, wherein the first scheduling period is a next scheduling period after the second scheduling period.

17. The apparatus according to claim 16, wherein the programming instructions cause the processor to:
schedule the terminal devices based on the initially configured transmit power of the first carrier.

18. A non-transitory computer-readable storage medium storing programming instructions, which, when executed by a processor of a network device, cause the processor to perform operations comprising:
estimating a first transmit power based on a traffic volume of to-be-scheduled terminal devices in a first carrier in a first scheduling period, wherein the first transmit power is a transmit power in the first carrier for scheduling the to-be-scheduled terminal devices in the first scheduling period;
estimating a second transmit power based on the first transmit power and an initially configured transmit power of the first carrier, wherein the second transmit power is a remaining transmit power of the first carrier in the first scheduling period;
calculating a third transmit power based on the second transmit power and a preset shared transmit power, wherein the third transmit power is a sharable transmit power of the first carrier in the first scheduling period;
broadcasting information about the third transmit power to the transmit power sharing group;
receiving information about a fourth transmit power, wherein the fourth transmit power is a sharable transmit power of a second carrier in the transmit power sharing group; and
calculating a fifth transmit power based on the information about the third transmit power and the information about the fourth transmit power, wherein the fifth transmit power is an actually shared transmit power of the first carrier in the first scheduling period.

19. The non-transitory computer-readable storage medium of claim 18, the operations further comprising:
exchanging the sharable transmit power of the first carrier and the sharable transmit power of the second carrier in the transmit power sharing group in a broadcast manner to perform transmit power sharing.

20. The non-transitory computer-readable storage medium of claim 18, wherein the transmit power sharing group comprises a plurality of carriers, and wherein the first carrier and the second carriers are any two carriers of the plurality of carriers in a transit power sharing group.

* * * * *